United States Patent [19]

Suzuki et al.

[11] Patent Number: 5,400,375
[45] Date of Patent: Mar. 21, 1995

[54] TRANSURANIUM ELEMENTS TRANSMUTING FUEL ASSEMBLY

[75] Inventors: Masao Suzuki, Ebina; Kazuo Arie, Yokohama; Masatoshi Kawashima, Yokohama; Yoshiaki Sato, Yokohama, all of Japan

[73] Assignee: Kabushiki Kaisha Toshiba, Kawasaki, Japan

[21] Appl. No.: 164,751

[22] Filed: Dec. 10, 1993

Related U.S. Application Data

[62] Division of Ser. No. 739,439, Aug. 2, 1991, Pat. No. 5,299,241.

[30] Foreign Application Priority Data

Aug. 3, 1990 [JP] Japan .................................. 2-205253
Sep. 29, 1990 [JP] Japan .................................. 2-262868

[51] Int. Cl.$^6$ .............................................. G21C 3/326
[52] U.S. Cl. .................................... 376/435; 376/170
[58] Field of Search ............... 376/170, 171, 182, 189, 376/267, 428, 435

[56] References Cited

U.S. PATENT DOCUMENTS 4,075,057  2/1978  Fletcher et al. ............... 376/189
4,721,596  1/1988  Marriott et al. ............... 376/189

FOREIGN PATENT DOCUMENTS 2-271294  11/1990  Japan ........................... 376/189

OTHER PUBLICATIONS

IAEA Technical Report Series No. 214 (1982) "Evaluation of Actinide Partioning and Transmutation".
Murphy et al, "Power Production and Actinide Elimination by Fast Reactor Recycle", Nuclear Tech. Oct. 1979, pp. 299-306.

*Primary Examiner*—Daniel D. Wasil
*Attorney, Agent, or Firm*—Oblon, Spivak, McClelland, Maier, & Neustadt

[57] ABSTRACT

In a transuranium elements transmuting reactor core in which a reactor is charged with a plurality of fuel assemblies at a core and an amount of a transuranium element to be added is controlled so as to prevent a fuel element contained in the fuel assemblies from melting, the amount of the transuranium elements to be added to the fuel element is controlled so as to keep an excess reactivity of the reactor substantially zero through an operation of the reactor. A charging density of minor actinides is set to lessen outwards of a core central portion in a core area where a plutonium content is made even. The charging density of minor actinides is set high accordingly in an area where a plutonium is enriched high at the core of a plutonium enriched area where a plutonium content varies. A transuranium elements transmuting fuel pin is formed by charging a transuranium fuel material in a fuel clad and the transuranium fuel material includes at least one of fuel materials consisting of an enriched uranium and an uranium-plutonium mixed fuel and a fertile material consisting of a natural uranium and a depleted uranium contain transuranium elements. In a transuranium elements transmuting assembly including a wrapper tube and a plurality of fuel pins enclosed in the wrapper tube, each of said fuel pin including a fuel clad. At least one part of the fuel pins are formed by charging a transuranium fuel material in the fuel clad with a transuranium fuel material inside.

2 Claims, 21 Drawing Sheets

| NUCLIDE | DECAY CONSTANT (1/sec) | ENERGY PER ONE DECAY (MeV) |
|---|---|---|
| $^{237}Np$ | $1.03 \times 10^{-14}$ | 4.956 |
| $^{241}Am$ | $5.09 \times 10^{-11}$ | 5.630 |
| $^{243}Am$ | $2.98 \times 10^{-12}$ | 6.158 |
| $^{242}Cm$ | $4.93 \times 10^{-8}$ | 6.217 |
| $^{244}Cm$ | $1.21 \times 10^{-9}$ | 5.902 |

FIG. 11A

| NUCLIDE | HEATING RATE PER 1g OF NUCLIDE (W/g) | HEATING RATE PER 1cm³ OF FUEL PELLET (W/cm³) |
|---|---|---|
| $^{237}$Np | $2.1 \times 10^{-5}$ | $2.0 \times 10^{-6}$ |
| $^{241}$Am | $1.1 \times 10^{-1}$ | $1.1 \times 10^{-2}$ |
| $^{243}$Am | $7.3 \times 10^{-3}$ | $7.1 \times 10^{-4}$ |
| $^{242}$Cm | $1.2 \times 10^{2}$ | 11.8 |
| $^{244}$Cm | $2.8 \times 10^{0}$ | $2.8 \times 10^{-1}$ |

FIG. 11B

| NUCLIDE | NEUTRON CAPTURE CROSS SECTION (b: BARN) |
|---|---|
| $^{238}$U | 0.3 |
| $^{237}$Np | 1.6 |
| $^{241}$Am | 1.7 |
| $^{243}$Am | 1.5 |
| $^{242}$Cm | 0.5 |
| $^{244}$Cm | 0.7 |

FIG. 12

| ITEMS | EXEMPLARY EMBODIMENTS |
|---|---|
| REACTOR THERMAL POWER | 2.600 MWt |
| OPERATION CYCLE LENGTH | 365 Days |
| NUMBER OF Pu-ENRICHMENT | 2 |
| MEAN MA CONTAINING RATE IN CORE | 5 wt % |
| RADIAL DISTRIBUTION OF MA CHARGING CONCENTRATION | Fig. 14 |
| Mx. HEATING RATE OF NEW FUEL ASSEMBLY OUTSIDE CORE | ≒ 5 KW/unit |
| MA NUCLIDE CONTAINING IN ABOVE FUEL ASSEMBLY | |
| $^{237}Np$ | 5 wt % |
| $^{241}Am$ | 2 wt % |
| $^{243}Am$ | 1 wt % |
| $^{242}Cm$ | 0.02 wt % |
| $^{244}Cm$ | 1 wt % |
| LEFT SIDE VALUE IN Eq. (3) | 0.94 |
| Mx. EXCESS REACTIVITY DURING RECTOR OPERATION | ≒ 0.5 % $\Delta k/k$ |
| MA TRNSMUTING SPEED | ≒ 150 kg/year |

FIG. 13

TRANSURANIUM ELEMENTS TRANSMUTING FUEL ASSEMBLY

This is a division of application Ser. No. 07/739,439, filed on Aug. 2, 1991, now U.S. Pat. No. 5,299,241.

BACKGROUND OF THE INVENTION

The present invention relates to a technology for transmuting transuranium elements and more particularly to a transuranium transmuting reactor core for transmuting the transuranium elements at a fast reactor and also to a transuranium elements transmuting fuel pin and fuel assembly charged into a reactor core of a fast reactor.

A spent fuel discharged from a thermal reactor such as boiling water reactor or the like includes transuranium elements (hereinafter called TRU elements) such as neptinium-237 ($^{237}$Np), americium-241 ($^{241}$Am), americium-243 ($^{243}$Am), curium-242 ($^{242}$Cm), curium-244 ($^{244}$Cm) and others which are high-level radioactive wastes, and in minor actinides (hereinafter called MA elements) present after eliminating plutonium (Pu) from the TRU elements, there exists elements such as $^{237}$Np, $^{241}$Am, $^{243}$Am or the like having an extremely long half life such as 2.14 million years, 432 years, 7,380 years, which cannot be quenched within a short period of time. Thus, it is desired that the MA elements are transformed into elements with a short half life through a nuclear transmutation in a short period of time.

A prior art includes technique for transmuting the TRU element which comprises using a fast reactor extremely high in a neutron energy as compared with a thermal reactor and subjecting the TRU elements charged into a fuel charged in a core of the fast reactor to a nuclear transmutation ((1) "Conceptional Design Study on Actinide burning Fast Reactor", T. Osugi et al., JAER1-M 83-217, issued by Japan Atomic Energy Research Institute in December 1983; (2) "Transmutation of Transuranics in FBR", A. Sasahara, T. Matsumura, F7, Fall Meeting Reports, Atomic Energy Society of Japan, 1988).

The prior art TRU elements transmuting comprises transmuting the aforementioned MA elements by causing a transmutation shown in FIGS. 9A to 9C to the typical MA elements of $^{237}$Np, $^{241}$Am and $^{243}$Am which are main objects of transmuting at a fast reactor core.

In FIGS. 9A to 9C, F.P. denotes fission products, and elements given in a square border around indicates that of being easy to cause a fission against a neutron energy in the fast reactor, namely, that its energy averaged fission cross-sections are about 1 burn or over.

The prior art TRU elements transmuting process utilizes a feature of the fast reactor core effectively, and the feature comes in:

(1) Since a neutron energy of the fast reactor core is high, a neutron capture is hard to occur in $^{237}$Np, $^{241}$Am and $^{243}$Am and the like, and thus an evil influence of the fast reactor on a neutron economy according to the charging of the TRU elements into the reactor core is relatively small (a neutron capture cross-section getting small according as the neutron energy becomes high as shown in FIG. 18).

(2) The fast reactor is generally high by about 1 digit in a neutron flux level as compared with the thermal reactor, therefore the TRU elements can be subjected to a nuclear transformation even if a fission and neutron capture cross section on an energy average is small, and thus a high transmuting efficiency of the TRU elements is ensured.

In the prior art transmuting of the TRU elements, nothing has been taken particularly into consideration for charging amount of the TRU elements charged into a fast reactor core and its distribution in core when carrying out a transmuting of the TRU elements. Still, however, only a self-evident technical care on charging the core with the TRU elements as much as possible has been considered for enhancing a transmuting efficiency of the TRU elements.

However, if the fast reactor core is charged with the TRU elements as much as possible, then the following problems are capable of resulting therefrom.

(1) If the MA elements to be transmuted is added to uranium-plutonium mixed fuel, a melting point of the mixed fuel lowers. Then the melting point drop is capable of causing a fuel melting, thus a measure such as lowering a reactor power or the like will be necessary for avoiding the fuel melting, which may deteriorate the transmuting efficiency of the MA elements.

(2) As will be apparent from FIGS. 9A to 9D, the typical MA elements to be transmuted is generally hard to bring about a fission, and hence is transformed into fissionable elements by a neutron capture. Accordingly, if the fast reactor core is charged with the TRU element excessively much, then, as shown in FIG. 19, an amount of fissionable elements produced newly by the neutron capture of the MA element according to a neutron irradiation comes to exceed fissionable elements transmuted by fission, thus an excess reactivity of the fast reactor increasing.

Consequently, if the charging amount of the TRU elements and its distribution are not specified properly, an excessive change or distortion may arise on a reactor power distribution and a neutron flux distribution, thus leading to problems on safety and characteristics of the reactor.

(3) The TRU elements to be transmuted are easy to cause an alpha-decay in most cases, and an alpha ray energy emitted at the time of the alpha-decay is relatively high at 4 to 6 MeV generally. Accordingly, if the MA elements are added much to a fuel, a calorific value and a source intensity of gamma ray, neutron and others become excessive from the state of a fresh fuel before loading into the fast reactor core. Further, at the time of assembling, storage and transportation of new fuel assemblies in which the MA elements are enclosed, a heat removing of the alpha ray energy becomes difficult and the fuel overheats to lead to a failure in a worst case.

(4) When charging a fast reactor uniformly with the TRU elements to be transmuted at the core with a core for which a plutonium enrichment is one kind as a base, a radial distribution of the power density, namely a radial power distribution during operation of the reactor becomes small according as it comes outside, as shown in FIG. 20, therefore a transmuting efficiency of the TRU element and a plant power generation efficiency being unsatisfying.

(5) When charging the reactor uniformly with the TRU elements at the core with the fast reactor core for which a plutonium enrichment is two or more than two kinds as a base, a radial power distribution of the core is improved as compared with FIG. 20 by an adjustment of the plutonium enrichment, a flatting requirement can thus be satisfied, however, as shown in FIG. 21, for example, there arises a portion where the power distribution largely fluctuates according to burn-up.

On the other hand, a flow rate of a coolant flowed for cooling down the fast reactor core is constant through the lifetime of a reactor plant. The flow rate of the coolant to fuel assemblies is set adaptively to the time when the power is maximized. Thus, when the output distribution fluctuates largely according to the burn-up of the fuel, a heat removing efficiency deteriorates, a heating efficiency gets lowered furthermore, which is not preferable from the viewpoint of an economical operation of the reactor plant.

SUMMARY OF THE INVENTION

An object of the present invention is to substantially eliminate defects or drawbacks encountered in the prior art described above and to provide a transuranium elements transmuting reactor core capable of transmuting the TRU elements efficiently without causing a failure of the fuel assemblies, increase of excess reactivity, deterioration of thermal efficiency and others.

Another object of the present invention is to provide a transuranium element transmuting fuel and fuel assembly capable of preventing the lowering of the power density of a fast reactor and the distortion of the power distribution of the fast reactor and effectively transmuting the TRU elements.

These and other objects can be achieved according to the present invention by providing, in one aspect, a transuranium element transmuting reactor core in which a reactor is charged with a plurality of fuel assemblies at a core and an amount of a transuranium element to be added is controlled so as to prevent a fuel element contained in the fuel assemblies from melting, and in the improvement, the amount of the transuranium elements to be added to the fuel assemblies is controlled so as to keep an excess reactivity of the reactor substantially zero through operation of the reactor.

In another aspect, there is provided a transuranium element transmuting reactor core in which a reactor is charged with a plurality of fuel assemblies at a core and an amount of a transuranium element to be added is controlled so as to prevent a fuel element contained in the fuel assemblies from melting, and in the improvement, charging amounts of $^{242}Cm$, $^{244}Cm$ and $^{241}Am$ are set so as to satisfy an equation $$1.2 \times 10^2 \times M_{242} + 2.8 \times M_{244} + 1.1 \times 10^{-1} \times M_{241} < {}_1Q$$

where an upper bound of heating rates of the single fuel assembly outside the reactor is $_1Q$ from the view point of the fuel assembly integrity, charging amounts of $^{242}Cm$, $^{244}Cm$ and $^{241}Am$ and also satisfy an equation $$1.2 \times 10^2 \times M_{242}{}^L + 2.8 \times M_{244}{}^L + 1.1 \times 10^{-1} \times M_{241}{}^L < {}_2Q$$

where an upper bound of the heating rates, per unit length of the fuel pellet contained in the fuel pins is $_2Q$ from the view point of the fuel element integrity, charging amounts of $^{242}Cm$, $^{244}Cm$ and $^{241}Am$ per the unit length are $M_{242}{}^L$, $M_{244}{}^L$ and $M_{241}{}^L$.

In a further aspect, there is provided a transuranium element transmuting reactor core in which a reactor is charged with a plurality of fuel assemblies at a core and an amount of transuranium elements to be added is controlled so as to prevent a fuel element contained in the fuel assemblies from melting and in the improvement, a charging density of minor actinides is set to lessen outwards of a core central portion in a core area where a plutonium content is made even.

In a still further aspect, there is provided a transuranium element transmuting reactor core in which a reactor is charged with a plurality of fuel assemblies at a core and an amount of transuranium elements to be added is controlled so as to prevent a fuel element contained in the fuel assemblies from melting and in the improvement, a charging density of minor actinides is set high accordingly in an area where a plutonium is enriched high at the core of a plutonium enriched area where a plutonium content varies.

In a still further aspect, there is provided a transuranium element transmuting fuel pin wherein a transuranium fuel pin is formed by charging a transuranium fuel material in a fuel clad and the transuranium fuel material includes at least one of fuel materials consisting of an enriched uranium and a uranium-plutonium mixed fuel and a fertile material consisting of a degraded uranium, a natural uranium and a depleted uranium contain transuranium elements such as Np, Am and Cm.

In a still further aspect, there is provided a transuranium element transmuting fuel assembly including a wrapper tube and a plurality of fuel pins enclosed in the wrapper tube, each of the fuel pins including a fuel clad, wherein at least one part of the fuel pins are formed by charging a transuranium fuel material in the fuel clad with a transuranium fuel material inside.

In a preferred embodiment, the fuel pins enclosed in the wrapper tube comprises transuranium fuel pins charged with the transuranium fuel material and fuel material pins charged with a fuel material consisting of an enriched uranium and a uranium-plutonium mixture fuel, and a radioactive fission product such as Sr or alkaline metals is contained in the transuranium fuel material.

In the transuranium element transmuting reactor core according to the present invention, since an amount of transuranium elements to be added to a fuel pin of the fuel assemblies is controlled so as to keep an excess reactivity of the reactor substantially zero through an operation of the reactor, a decrease of effective multiplication factor according to the lapse of time for operation will be prevented, an excessive deterioration or turbulence of the reactor power distribution can be prevented, and as looking for improvement of a power plant capacity factor from enhancing a reliability of the plant, transuranium elements (TRU elements) can be transmuted efficiently.

Further, from setting loading amounts of $^{242}Cm$, $^{244}Cm$ and $^{241}Am$ so as to realize:

$$1.2 \times 10^2 \times M_{242} + 2.8 \times M_{244} + 1.1 \times 10^{-1} \times M_{241} < {}_1Q$$

where an upper bound of the single fuel assembly power assembly outside the reactor is $_1Q$ from the view point of the fuel assembly integrity, loading amounts of $^{242}Cm$, $^{244}Cm$ and $^{241}Am$ which can be loaded into the single fuel assembly are $M_{242}$, $M_{244}$ and $M_{241}$, and also to realize:

$$1.2\times 10^2\times M_{242}{}^L+2.8\times M_{244}{}^L+1.1\times 10^{-1}\times M_{241}{}^L < Q_2$$

where an upper bound of the heating per unit length of the fuel element contained in the fuel assemblies is $Q_2$ from the view point of the fuel element integrity, charging amounts of $^{242}Cm$, $^{244}Cm$ and $^{241}Am$ per the unit length are $M_{242}{}^L$, $M_{244}{}^L$ and $M_{241}{}^L$, a melting of the fuel element during operation of the reactor and an overheating or failure of the fuel assemblies outside the reactor can effectively be prevented, and an accident of a control rod and a neutron absorbing material of the control rod can be reduced by a neutron absorption effect of $^{242}Cm$, $^{244}Cm$ and $^{241}Am$, an enhancement of heat removing efficiency of the core can thus be realized, an economical operativity is also improved, and a safety and reliability of the core and the fuel assemblies are ensured as well, thus transmuting the TRU elements efficiently.

Further, by setting a charging density of minor actinides to lessen outwards of a core center in a core area where a plutonium content is even, and also by setting a charging density of minor actinides high accordingly in an area where Pu is enriched high at the core of a Pu-enriched area where a plutonium content varies, a flatting requirement of a radial distribution of the reactor power can be satisfied, an enhancement of safety and reliability of the core and the fuel assemblies will be realized without causing the excessive deterioration and turbulence of the reactor power distribution, thus traansmuting the TRU elements efficiently.

In a further aspect, according to the transuranium element transmuting fuel assembly of the characters described above, even if the transuranium fuel material is charged in the transuranium fuel pin, the degradation of the core power density and the distortion of the core axial power distribution can be effectively prevented, thus improving the core cooling efficiency and effectively transmuting the transuranium element.

BRIEF DESCRIPTION OF THE DRAWINGS

For a better understanding of the present invention and to show how the same is carried out, reference will be made, by way of preferred embodiments, to the accompanying drawings, in which:

FIG. 11A is a graph showing a decay constant of main MA elements and an emitted energy per decay;

FIG. 11B is a graph showing heat rating resulting from a decay of these MA elements when each MA element is added to the fuel pellet;

FIG. 12 is a view showing a neutron capture cross section of the main elements at a fast reactor core;

FIG. 13 is a view showing main specification characteristics of a first embodiment of the TRU elements transmuting reactor core relating to the present invention;

DESCRIPTION OF THE PREFERRED EMBODIMENTS

One embodiment of a transuranium element transmuting reactor core relating to the present invention will now be described with reference to the accompanying drawings.

Figure 1:
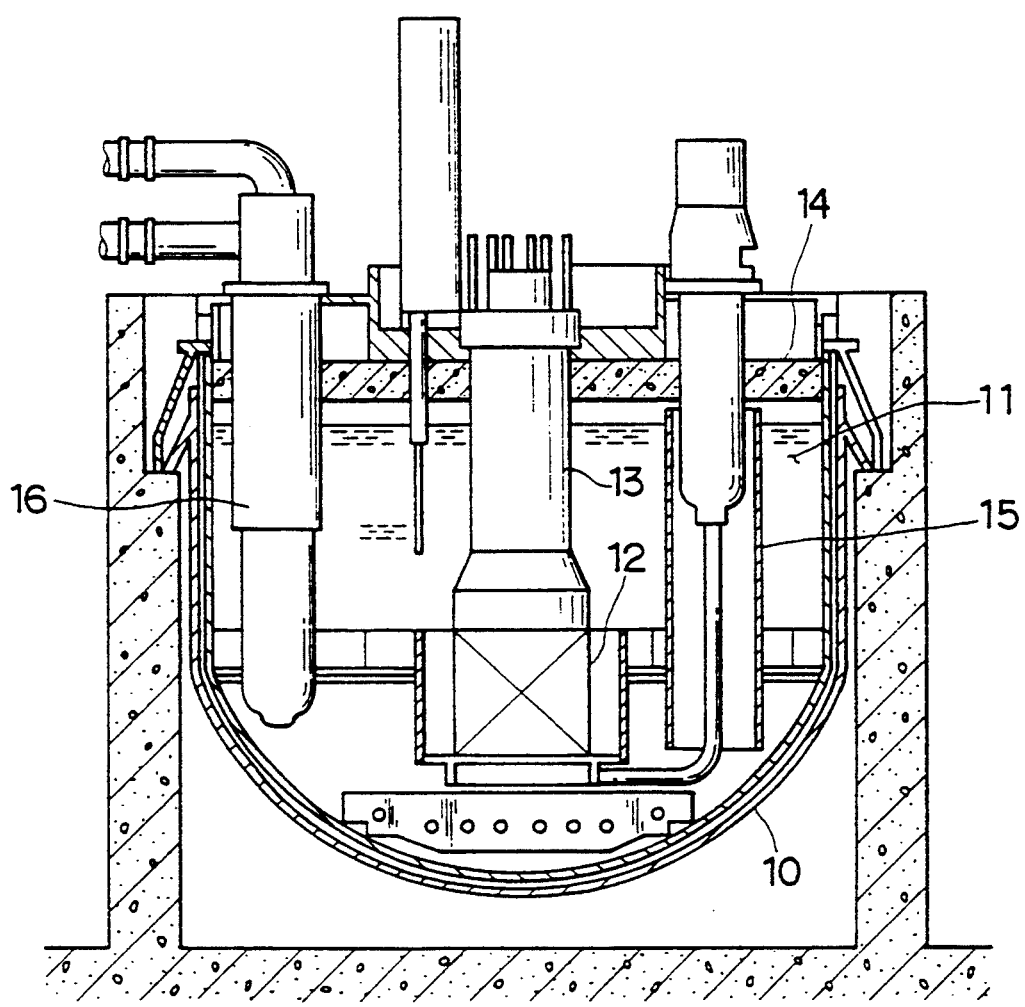
FIG. 1 is a longitudinal sectional view exemplifying the case where a transuranium element transmuting reactor core relating to the present invention is applied to a oolk type fast reactor.

FIG. 1 represents a basic conception of a nuclear reactor such as pool type fast reactor enclosing the transuranium elements transmuting reactor core of the present invention. The present invention is applicable to a core of the nuclear reactor of a type to remove heating from cooling the core by flowing a coolant thereto and the coolant then includes liquid Na, liquid NaK, He gas and the like, which is intended for the core for which a fission is caused chiefly by a fast neutron.

FIG. 1 represents an example of a pool type fast reactor, however, a loop type fast reactor may be exemplified, needless to say, in this case. The nuclear reactor includes a reactor vessel 10 which is charged with a liquid sodium (Na) 11 as a coolant. A core 12 is provided at a central portion in the reactor vessel 10, and a upper core structure 13 is provided above the core 12. The upper core structure 13 is supported by a roof slab 14 working as a shielding plug to cover a top of the reactor vessel 10. A primary coolant pump 15 and an intermediate heat exchanger 16 and others are suspended on the roof slab 14. A cover gas such as inert gas or the like is enclosed between the roof slab 14 and a free liquid surface of the liquid Na 11.

Figure 2:
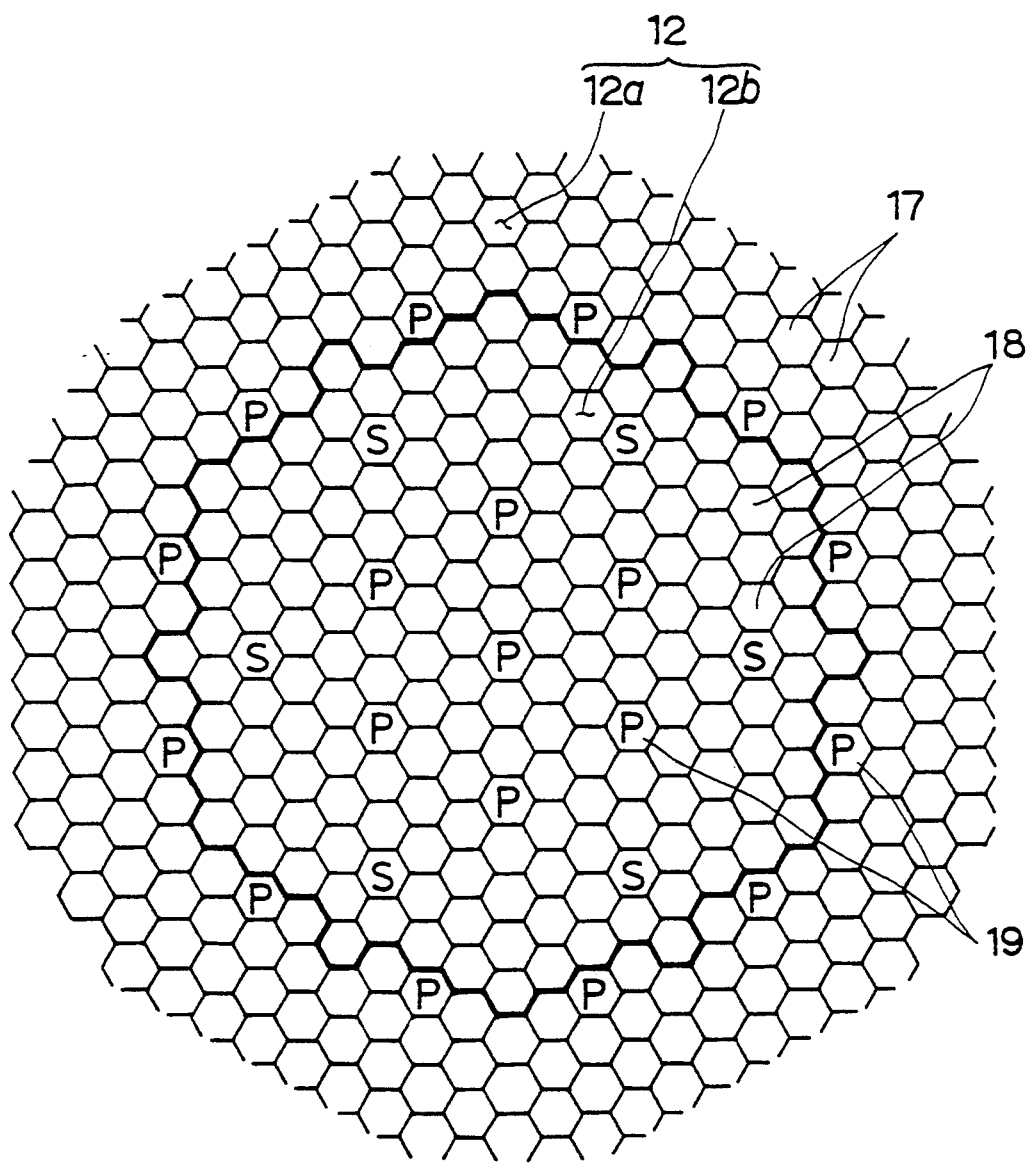
FIG. 2 is a plan view showing a fast reactor core to which the transmuting reactor core of the present invention is applied.

The core 12 enclosed in the reactor comprises, as shown in FIG. 2 for example, two region cores 12a, 12b. A fuel assembly 17 relatively high in plutonium content is disposed in the outer peripheral area 12a and a fuel assembly 18 relatively low in plutonium content is disposed in the central area 12b. For charging amount of the MA elements of the TRU elements to be transmuted which is charged into the fuel assemblies 17, 18, a charging density of the MA elements is controlled at every areas or fuel assemblies 17, 18. A reference numeral 19 denotes a control rod.

Figure 3:
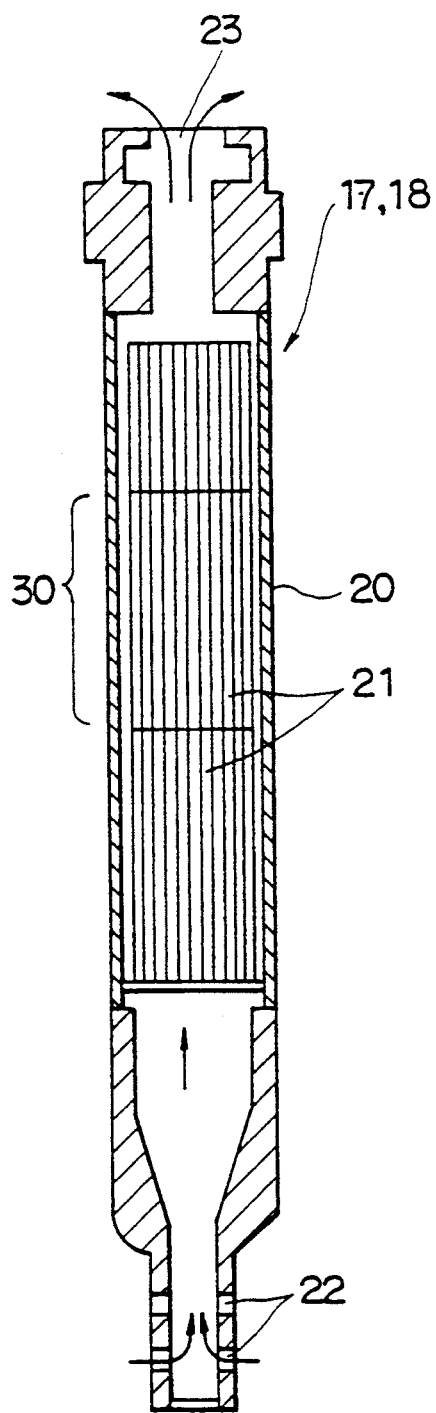
FIG. 3 is a view showing a fuel assembly charged into the fast reactor core.

As exemplified in FIG. 3, the fuel assemblies 17, 18 have a plurality of fuel pins 21 enclosed in a bundle within a hexagonal wrapper tube 20 as a fuel element in a wide sense. A coolant inlet 22 is formed on a lower portion of the wrapper tube 20, and a coolant outlet 23 is formed on an upper portion.

Figure 4:
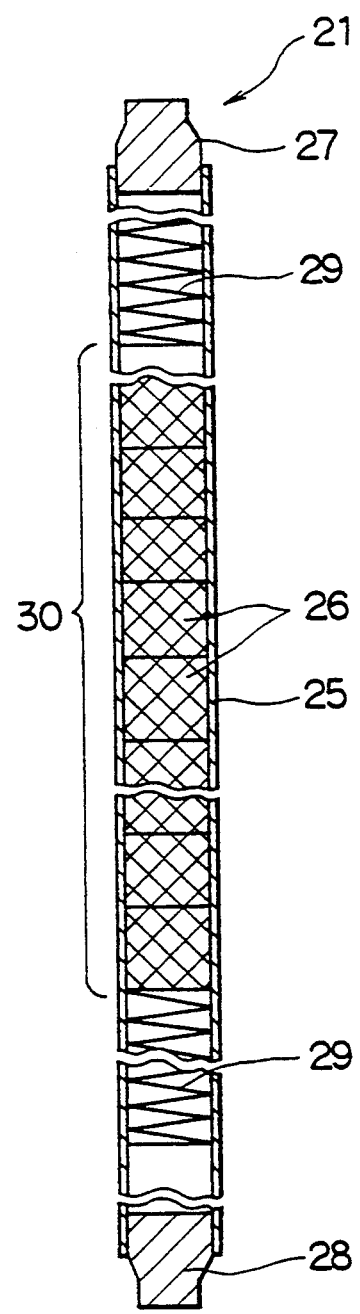
FIG. 4 is an elevational section showing a fuel pin (fuel element) enclosed within the fuel assembly.

With opposite ends sealed up with an upper end plug 27 and a lower end plug 28, the fuel pin 21 enclosed within the wrapper tube 20 is that for which a plurality of fuel pellets 26 are inserted in a row, as shown in FIG. 4, within a fuel clad 25 as a fuel element. The fuel pellets 26 are retained elastically by a spring 29 within the fuel clad 25, a fuel stack portion 30 being constructed as an effective fuel length. The fuel pellet 26 is that for which as oxide fuel matter as fuel element is sintered through ceramics.

A so-called metallic fuel is available for the fuel element instead of the oxide fuel matter, and the fuel element is not necessarily a thoroughly sealed type covered by the fuel clad 25. For example, a so-called vented fuel element (fuel pin) which discharges fission products gas (hereinafter called FP gas) such as He gas or the like outside the fuel element by fission is acceptable otherwise.

On the other hand, the fuel assemblies 17, 18 are charged with the TRU elements (transuranium elements) to be transmuted, and a concrete case for controlling a charging amount of a main MA elements of the TRU elements to be charged is exemplified as follows:

(1) An amount of the elements is controlled so that the MA elements to be transmuted which is added into the fuel pellets 26 will be distributed uniformly.

(2) The fuel pellets with the MA elements to be transmuted relatively high in density and the fuel pellets with the elements relatively low in density or almost not added are prepared and a charging number of each fuel pellet to a fuel pin is controlled, thereby controlling the charging amount. An array order of the fuel pellets is arbitrary.

Figure 5:
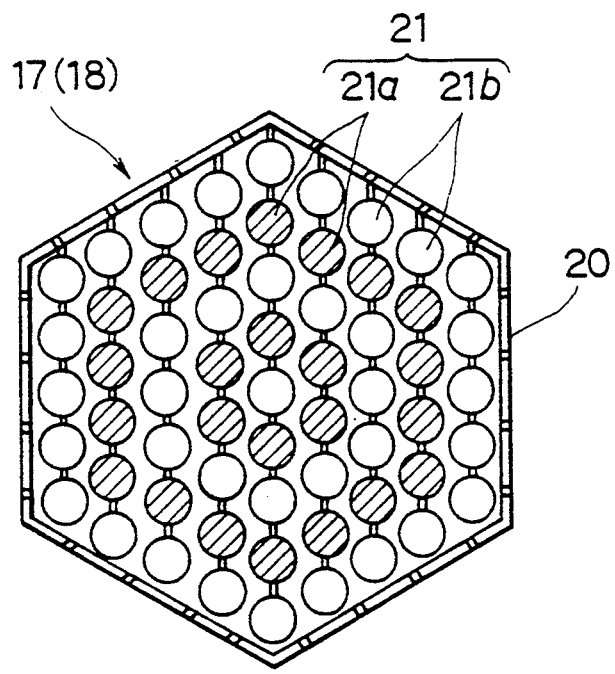
FIG. 5 and FIG. 6 are views exemplifying an arrangement of the fuel pins enclosed in the fuel assembly.
Figure 6:
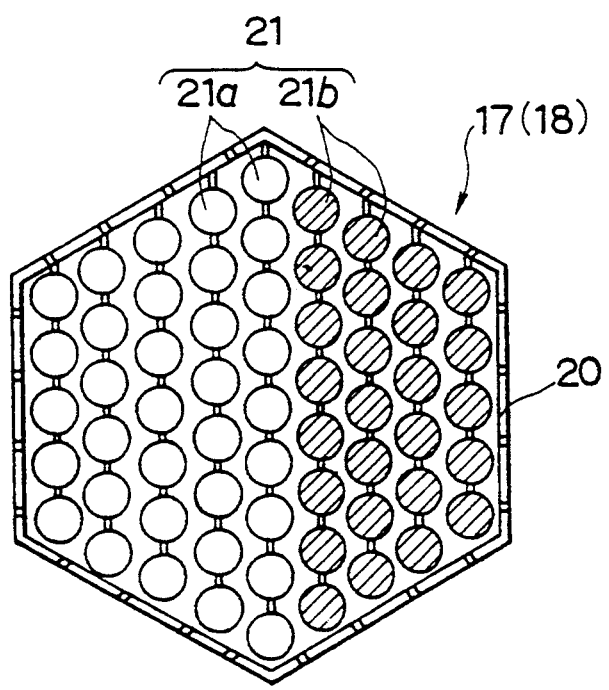

(3) The fuel pin 21a with the MA elements to be transmuted relatively much in charging amount and the fuel pin 21b with the MA elements relatively little in charging amount or almost not charged are prepared, and a number of the fuel pins 21a, 21b enclosed within the wrapper tube 20 is controlled as shown in FIG. 5 and FIG. 6, thereby controlling a charging amount of the MA elements per the fuel assemblies 17 and 18.

Figure 7:
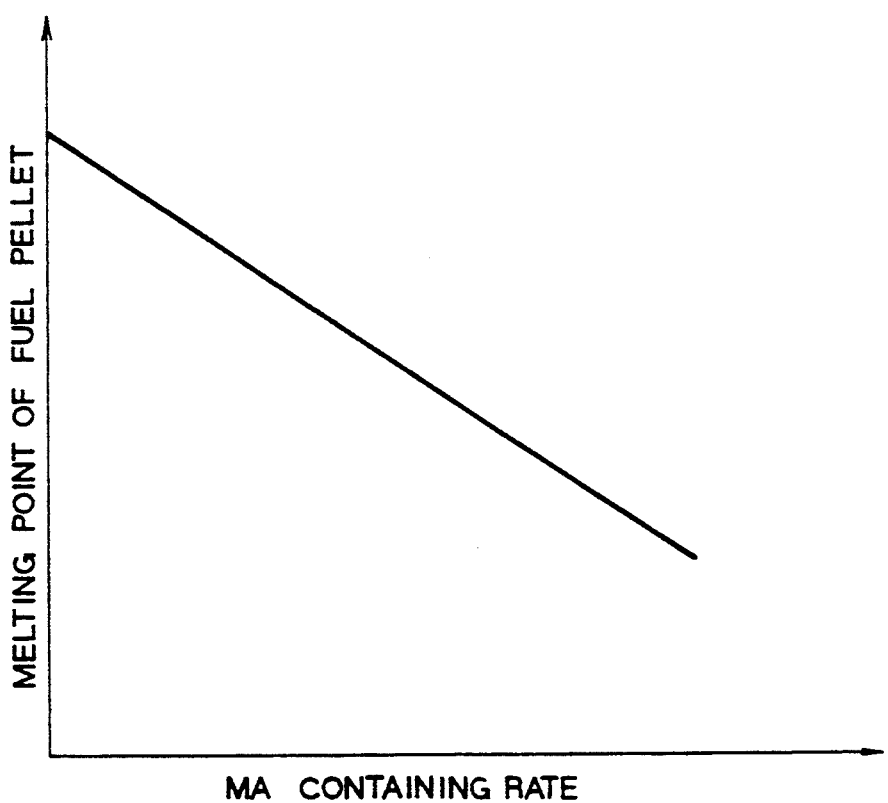
FIG. 7 is a graph showing a relation between an MA content in the fuel pellet and a fuel pellet melting point.

Meanwhile, if a percentage by weight of minor actinides (element with the atomic number 92 or over excluding uranium and plutonium; hereinafter called MA element) to total actinides with the atomic number 92 or over is called minor actinides content (hereinafter called MA content), a relation in the melting point between the MA content and the fuel pellet 26 is as indicated in FIG. 7, and a melting point of the fuel pellet 26 drops according as the MA content increases. Thus, a melting point of the fuel pellet to which the MA elements are added for transmuting the MA elements drops as compared with the fuel pellet to which the MA elements are not added, thereby facilitating a fuel melting.

It is then necessary that a reactor power be lowered in a nuclear reactor so as to keep the fuel elements from being melted during operation of the nuclear reactor regardless of the melting point drop, and a neutron flux level of the nuclear reactor lowers due to a decrease of the reactor power.

Figure 8:
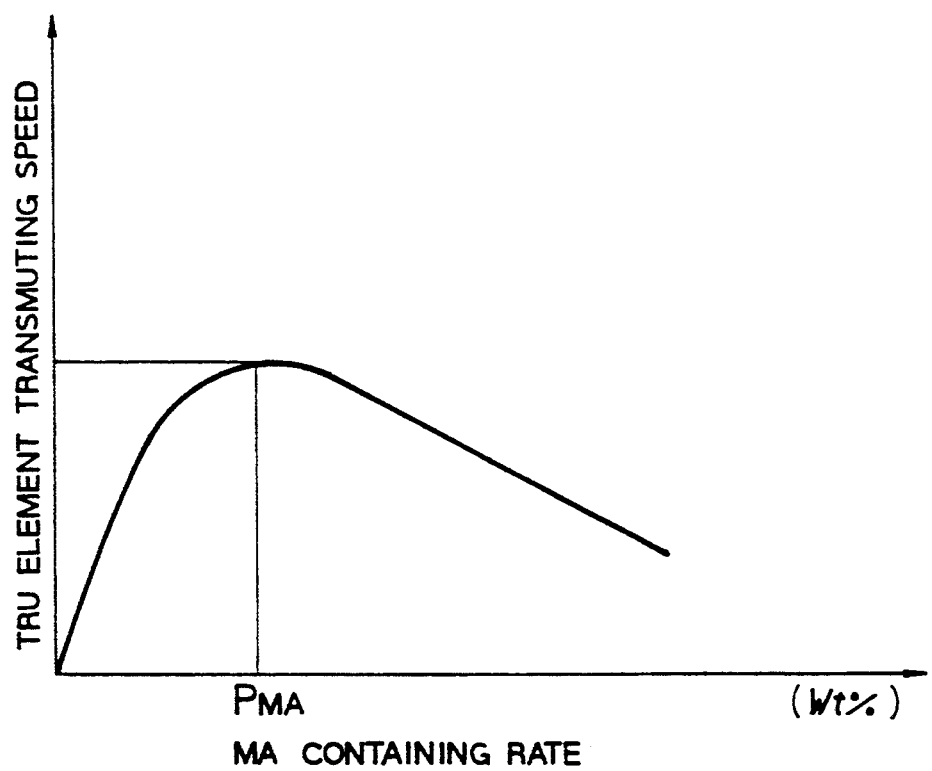
FIG. 8 is a graph showing a relation between a TRU transmuting rate and an MA content when a reactor power is adjusted according to the MA content for prevention of a fuel melting.
Figure 9A:
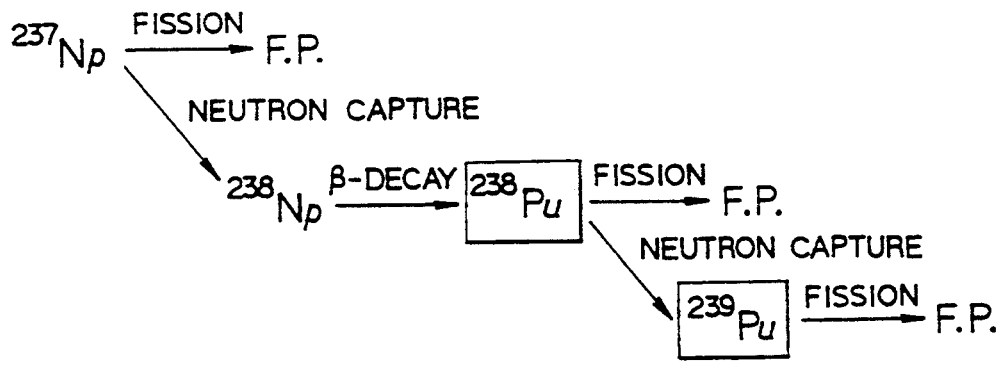
FIGS. 9A to 9D are views showing a nuclear transformation pass of typical TRU elements.
Figure 9B:
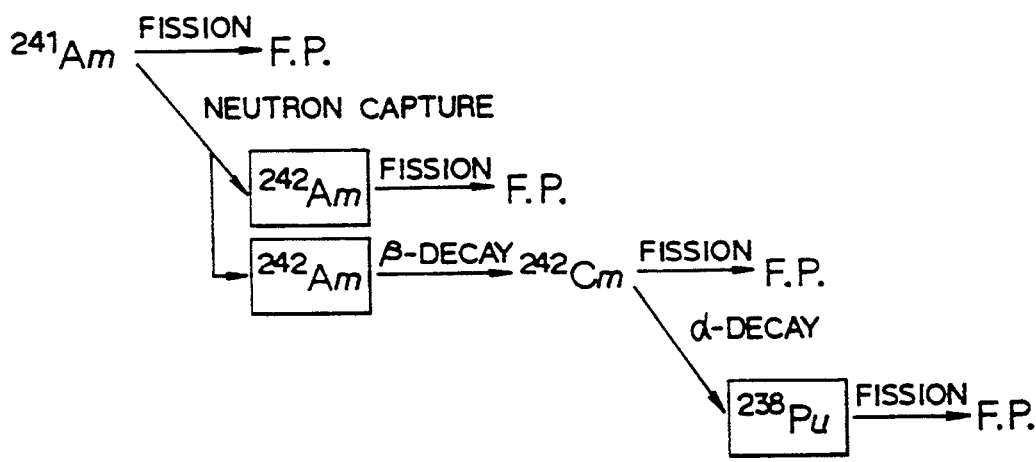
Figure 9C:
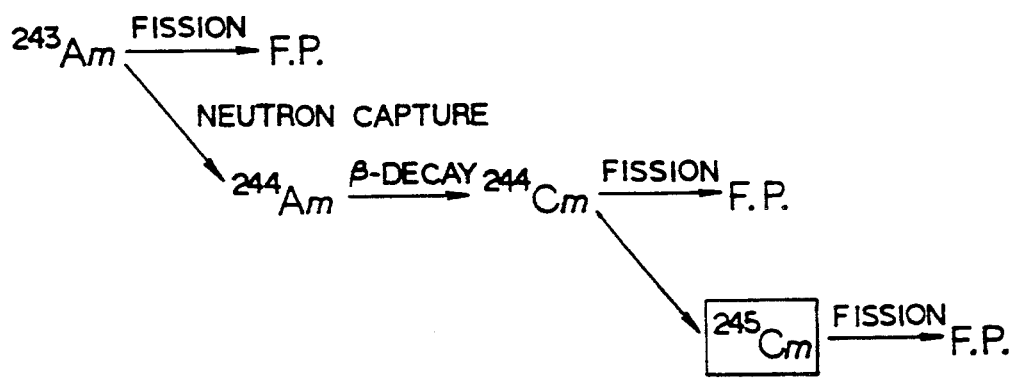
Figure 9D:
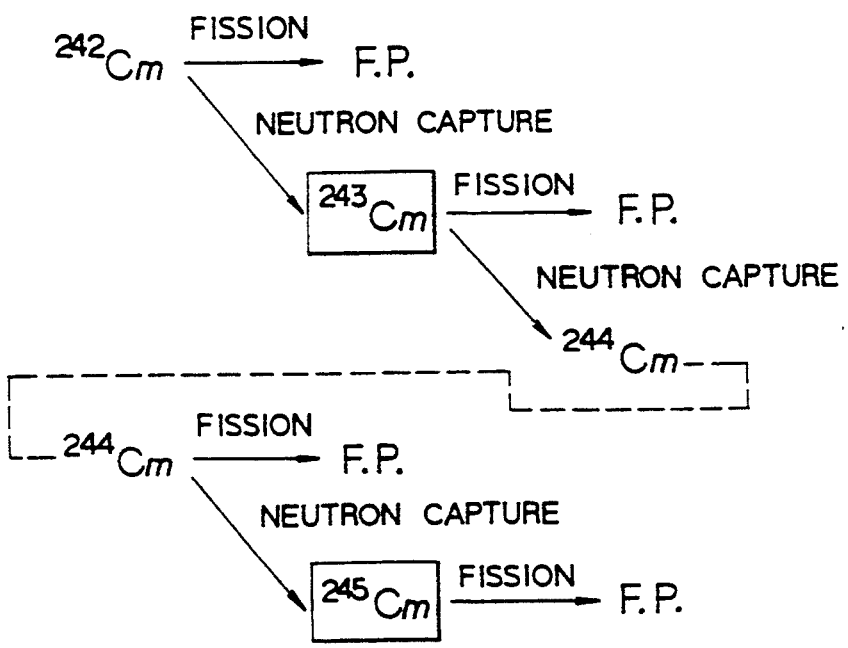

Meanwhile, a transmuting rates of the TRU elements is proportional to the MA content and the neutron flux level. When taking an adjustment of the reactor power further into consideration for prevention of a melting of the fuel element, the transmuting rates of the TRU elements is not always to rise monotonously along with an increase in the MA content, and, as shown in FIG. 8, there exists a peak portion whereat the TRU elements transmuting rates is maximized correlatively to the MA content. Then, an MA content $P_{MA}$ when the TRU elements transmuting rates is maximized is effective and hence is capable of realizing a transmuting of the TRU element most efficiently without causing a melting on the fuel element.

On the other hand, in the case of ordinary fast reactor core, fissionable elements contained in the fuel are lost in accordance with burnup and thus fission products are accumulated, and therefore, an effective multiplication factor indicating the degree of a criticality of the nuclear reactor (fast reactor) decreases according to the lapse of time for the reactor operation.

However, in the case of fast reactor core operation for transmuting of the TRU elements, main MA elements $^{237}$Np, $^{241}$Am, $^{243}$Am, $^{242}$Cm of the TRU elements to be transmuted are transformed, as shown in FIGS. 9A to 9D, into a fissionable elements easy to cause a fission by fast neutrons. Consequently, the effective multiplication factor comes to decrease moderately in accordance with the lapse of time for reactor operation.

Figure 10:
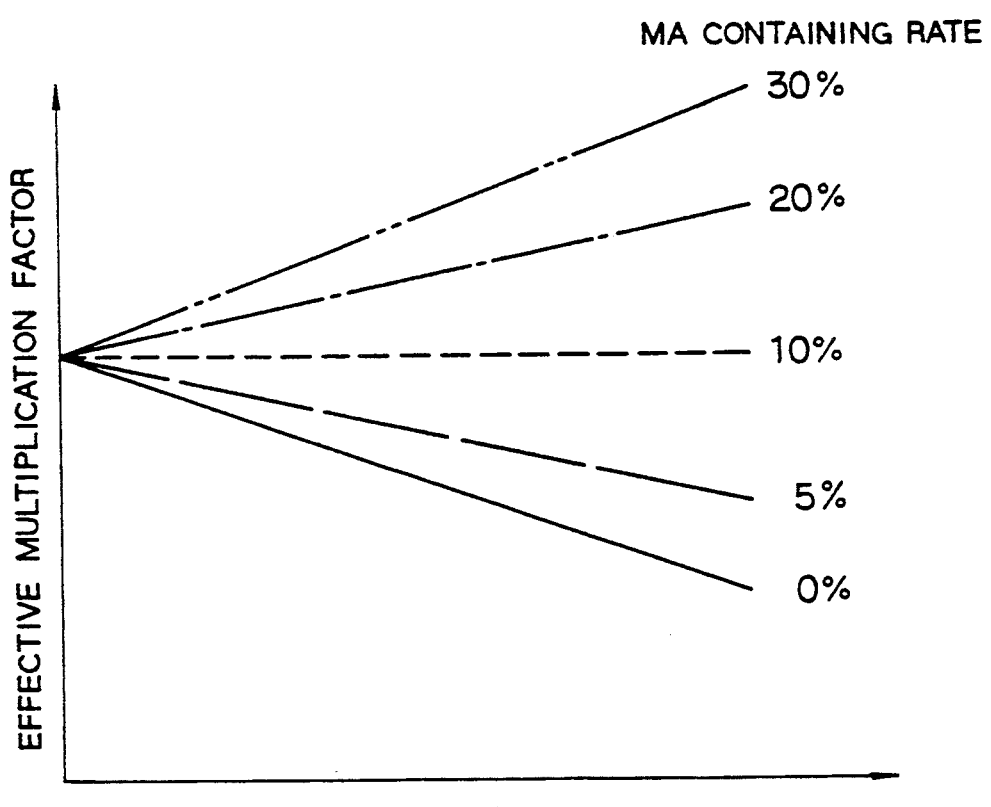
FIG. 10 is a view exemplifying the case where a transition of effective multiplication factor according to a reactor operation is appreciated at every mean MA content of the core.

As shown in FIG. 10, when the MA content becomes excessive, the TRU elements are transformed into the fissionable elements too much, and the effective multiplication factor is capable of increasing according to the lapse of time for the reactor operation. Accordingly, a transition of the effective multiplication factor according to the lapse of time for the reactor operation may be controlled by the MA content. Now, therefore, such reactor core as will suppress a change in the effective multiplication factor in accordance with the reactor operation and keep an excess reactivity of the reactor substantially zero through the reactor operation may be designed by controlling the MA content.

Further, a heating rates according to a decay of the MA elements of the TRU element can be calculated from a decay constant of each MA element and an energy emitted per decay. A decay constant of the MA elements to be transmuted and an energy emitted per decay are shown in FIG. 11A.

A heating rates per gram of each MA element may be calculated by means of data given in FIG. 11A as shown in FIG. 11B. The MA elements of those of the TRU elements which contribute influentially to heating are $^{242}$Cm, $^{244}$Cm and $^{241}$Am, and hence, it is understood that a heating of the TRU elements will be calculated by taking these MA elements into consideration.

On the other hand, if an upper bound of the heating rates per fuel assembly capable of removing heat is $Q_1(w)$, then amounts of $^{242}$Cm, $^{244}$Cm and $^{241}$Am capable of charging into the single fuel assembly must satisfy the following equation:

$$1.2 \times 10^2 \times M_{242} + 2.8 \times M_{244} + 1.1 \times 10^{-1} \times M_{241} < Q_1 \quad (1)$$

where, $M_{242}$: amount (g) of $^{242}$Cm charged into a single fuel assembly $M_{244}$: amount (g) of $^{244}$Cm charged into a single fuel assembly $M_{241}$: amount (g) of $^{241}$Am charged into a single fuel assembly Then, granted that the heating rates per a fuel assembly comes within the range capable of removing heat, if the heating is one-sided at a position, the fuel element is capable of being damaged, and therefore, there is a limit to the charging of the MA elements to be transmuted from the viewpoint of preventing a fuel rupture. That is, if an upper bound of the heating rates per cm in an axial length of a local one fuel pellet is Q (w), a charging amount of the MA elements to be transmuted at the position must satisfy the following equation:

$$1.2 \times 10^2 \times M_{242}{}^L + 2.8 \times M_{244}{}^L + 1.1 \times 10^{-1} \times M_{241}{}^L < Q_2 \quad (2)$$

where, $M_{242}{}^L$: amount (g) of $^{242}$Cm charged per cm in axial length of local one fuel pellet $M_{244}{}^L$: amount (g) of $^{244}$Cm charged per cm in axial length of local one fuel pellet $M_{241}{}^L$: amount (g) of $^{241}$Am charged per cm in axial length of local one fuel pellet Accordingly, to prevent a failure of the fuel assembly due to overheating, it is necessary that a charging amount of the MA elements of the TRU elements to be transmuted is controlled so as to satisfy the above Eqs. (1) and (2) at the same time.

For example, an upper bound of the heating rates per a fuel assembly, where a fuel stack general as the fuel assembly is 100 cm long, and fuel pins charged into the single fuel assembly are 271 pieces in number, is about 5 kw/assembly. In this case, an upper bound of addable amount of main MA elements $^{242}$Cm, $^{244}$Cm and $^{241}$Am which are contributive to heating to the fuel pellets is:

$^{242}$Cm: 0.05 percent by weight $^{244}$Cm: 2 percent by weight $^{241}$Am: 50 percent by weight Accordingly, in order that the fuel assembly with the TRU elements added thereto may not cause overheating and failure of the fuel element for transmuting of the TRU element at the time of assembling, storage and transportation, if percentages by weight of the MA elements $^{242}$Cm, $^{244}$Cm and $^{241}$Am to be transmuted to a total weight of the heavy metal elements of a fresh fuel pellet are $f_{242}$, $f_{244}$ and $f_{241}$, then it is necessary that:

$$\frac{f_{242}}{0.05} + \frac{f_{244}}{2} + \frac{f_{241}}{50} < 1 \quad (3)$$

be realized. So far as an amount of the main MA elements of the TRU elements added to the fresh fuel pellet satisfies Eq. (3), the fresh fuel assembly will never be overheated or damaged.

Further, as will be understood from FIG. 9, the MA elements of the TRU elements to be transmuted functions generally as a neutron absorber, and its degree is stronger than uranium 238 ($^{238}$U), as shown in FIG. 12, in the fast reactor core.

On the other hand, if the ratio of weight of plutonium element, or the plutonium content, to the weight of total heavy metal elements in the fuel pellet is called a plutonium (Pu) enrichment, in the fast reactor core, since the neutron flux level normally decreases according as it goes outside from the core center, the power density lowers according as it goes outside in the same Pu enrichment area. Accordingly, in the same Pu enrichment area at the fast reactor core operating for transmuting the TRU elements, the charging density of the MA elements to be transmuted which functions as a neutron absorber will be lessened gradually outside from the reactor core, thereby satisfying a flatting requirement. Thus, fluctuation and change of the reactor power are suppressed, and reliability and safety of the nuclear reactor can be enhanced.

Further, in the fast reactor core having the Pu enrichment in two kinds or more, since the area higher in the Pu enrichment has a high content of fissionable elements, and the fissionable elements are transmuted quick by burnup in accordance with the reactor operation. Thus in the area high in the Pu enrichment, a power density according to the operation lowers more. On the other hand, the MA elements to be transmuted are transformed, as shown also in FIGS. 9A to 9D, into fissionable elements by a neutron capture. Accordingly, from increasing the charging density of the MA elements to be transmuted in an area higher in the Pu enrichment, a decrease of the power density according to the operation of the nuclear reactor will be compensated for with the transformation into a fissionable elements of the MA elements to be transmuted, thus moderating the decrease of the power density according to the reactor operation.

Figure 14:
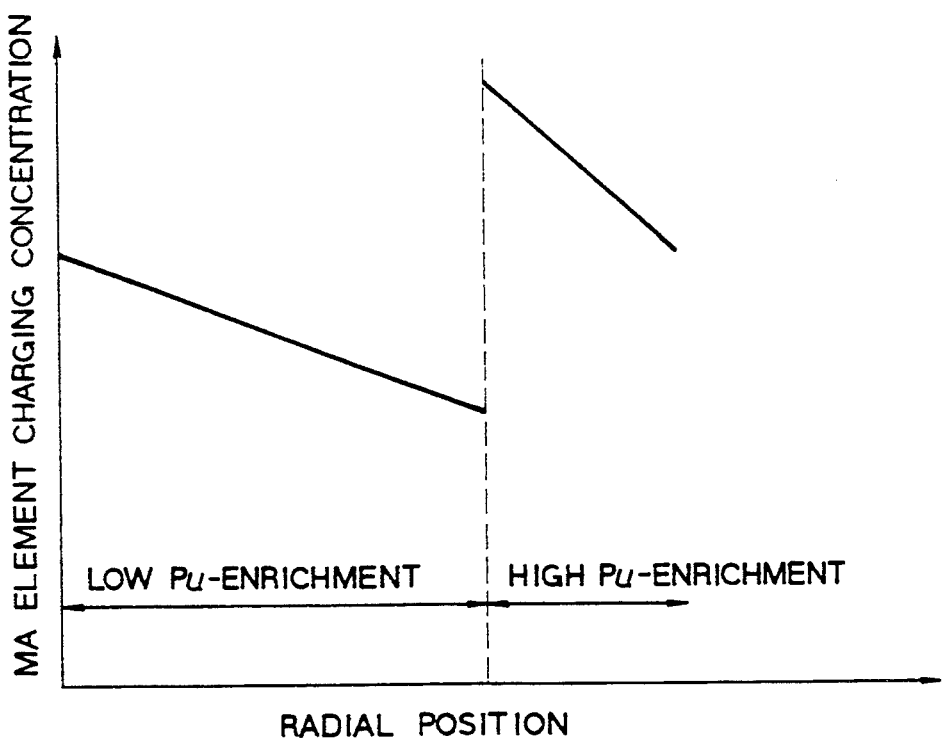
FIG. 14 is a graph showing a radial distribution of an MA charging density to a core in the first embodiment.

FIG. 13 exemplifies a main specification characteristic of a fast reactor core to which the TRU elements transmuting reactor core according to the present invention is applied, and FIG. 14 shows a charging density radial distribution of the MA elements charged into the transmuting reactor core.

The mean MA content of the fast reactor core in the example shown in FIG. 13 is, for example, 5 percent by weight. As shown in FIG. 8, the MA content is set so as to minimize an excess reactivity of the reactor to substantially zero, for example, in the range where a fuel fusion does not occur during operation of the reactor.

When the MA content is 5 percent by weight, an amount of the fissionable elements produced by a neutron capture of the charged MA elements is moderate to be balanced just sufficiently with the amount transmuted by fission, therefore an excess reactivity of the reactor during operation of the reactor being checked to be about 0.5% $\Delta K/K$ maximumly. In the case of an ordinary fast reactor core equivalent to the present embodiment in a reactor thermal power and the operation cycle length, the maximu excess reactivity during the operation is about 3% $\Delta K/K$.

In the example, since the MA elements has a neutron absorbing effect as a control rod, a required reactivity worth of the control rod may be minimized, thus the number of control rods and the required amount of neutron absorber such as boron, hafnium or the like which is charged into the control rod being reduced, and an economical efficiency will be enhanced.

If an excess reactivity of the reactor is low, a reactivity insertion into the reactor at the time when the control rod is drawn erroneously can be minimized, thereby ensuring a safety. Further, the excess reactivity of the reactor can be kept low through the reactor operation, and thus a reactivity loss of the reactor due to the reactor operation, namely the decrease of the effective multiplication factor according to burnup can be minimized.

Thus, the period of continuous operation of the reactor or the operation cycle length can be prolonged, and a plant capacity factor or besides the transmuting efficiency of the TRU elements may be enhanced.

Further, in the present embodiment, the charging density of the MA elements varies, as shown in FIG. 14, according to a position where the fuel assembly is charged into the reactor core, however, when a fresh fuel assembly outside the reactor is taken particularly into consideration, even in the case of the fresh fuel assembly whereby a heating rates is maximized, the MA elements are set within the range satisfied by the Eqs. (1) and (2) or (3) so as not to increase the heating rates excessively by a decay of the MA elements. Accordingly, the maximum heating rates of the fresh fuel assembly outside the reactor is about 5 kw/assembly, as shown in FIG. 13, and hence, a trouble such as failure due to the overheating of the fuel assembly or the like will not result at the time when assembling, storing and transporting the fresh fuel assembly.

Figure 15:
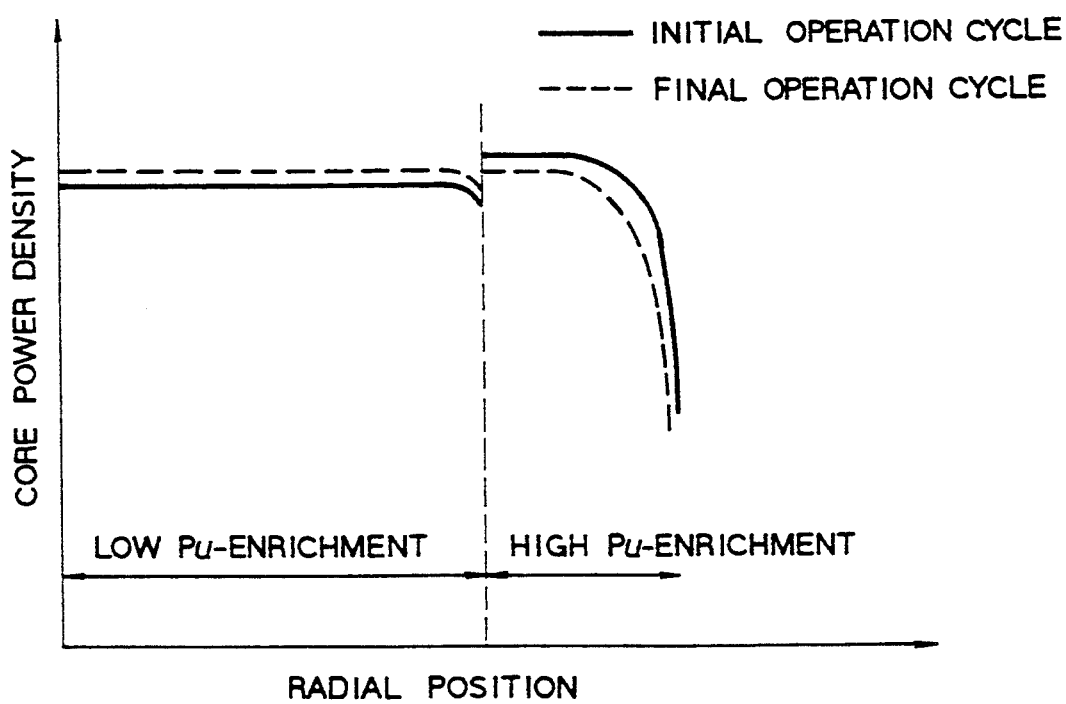
FIG. 15 is a graph showing a radial distribution of a power density in the first embodiment with reference to the beginning and the end of a reactor operation cycle.
Figure 21:
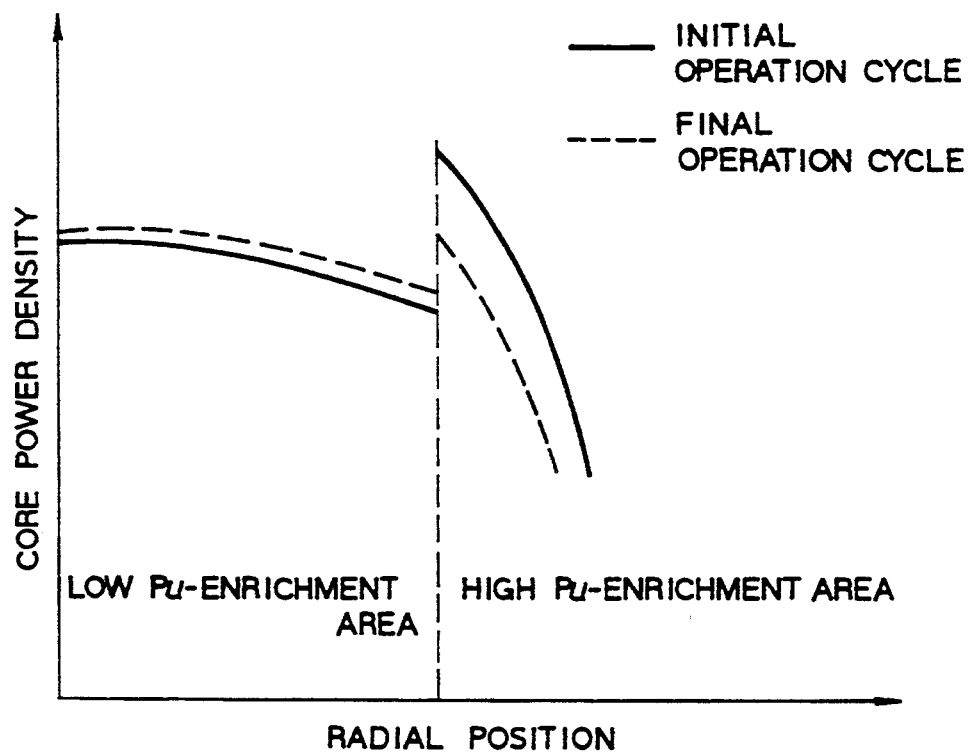
FIG. 21 is a graph comparing the beginning of the operation cycle with the end of the operation cycle for radial distribution of the power density where a Pu enrichment is two kinds in a prior art.

Still further, in the present embodiment, a radial distribution of the charging density of the MA elements at the reactor core is made less, as shown in FIG. 14, according as it goes outside of the reactor core in the same Pu-enriched area. Besides, since the MA elements functions as a neutron absorber, the neutron flux level getting large toward the core central portion is suppressed normally by the MA elements, and in result, the radial distribution of the neutron flux becomes flatter. Accordingly, as shown in FIG. 15, the radial distribution of the reactor power density is flattened during the period of the reactor operation cycle as compared with a prior art exemplified in FIG. 21. Thus, a local power peak will be kept from arising, and hence a thermal tolerance of the fuel assembly can be ensured thoroughly, thus enhancing an economical efficiency such as compacting and lightening the reactor core in structure.

Further, in the present embodiment, the area higher in Pu enrichment is kept high in the MA elements charging density as compared with the area lower in Pu enrichment, as shown in FIG. 14, the area higher in Pu enrichment has fissionable elements resulting from the neutron capture of the MA elements more than that.

On the other hand, a consumption due to the burnup of the fissionable plutonium is more with the area high in Pu enrichment where the fissionable plutonium is present much. Accordingly, the distribution of the MA elements charging density shown in FIG. 14 is set at every area of Pu enrichment so that the area with much consumption of the fissionable plutonium has much fissionable elements produced by the neutron capture of the MA elements, therefore a net decrease of the fissionable elements according to the reactor operation being suppressed, and, as shown in FIG. 15, a fluctuation of the power density according to operation is suppressed. Thus, if a fluctuation of the power density is minimized according to the operation of the fast reactor (nuclear reactor) or burnup, the heat removing efficiency is improved, the enhancement of economical efficiency is realized, and thus fuel temperature is decreased, and safety and reliability of the reactor core can be enhanced accordingly.

Figure 16:
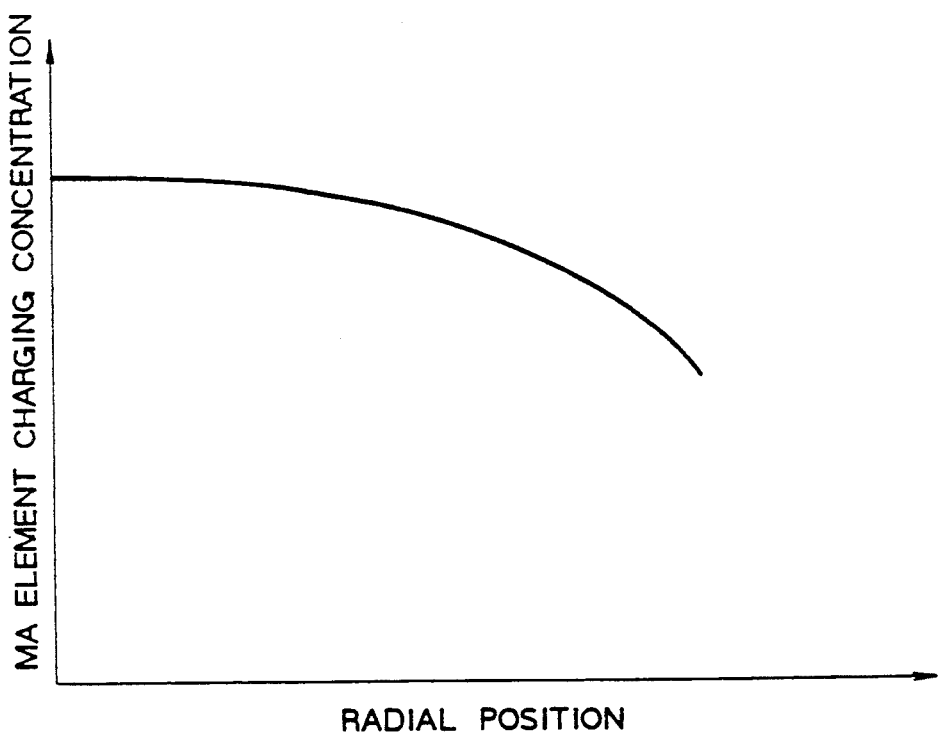
FIG. 16 is a graph showing a radial distribution of an MA charging density to a core in a second embodiment.

FIG. 16 is a graph representing a second embodiment of the TRU elements transmuting reactor core according to the present invention.

Figure 17:
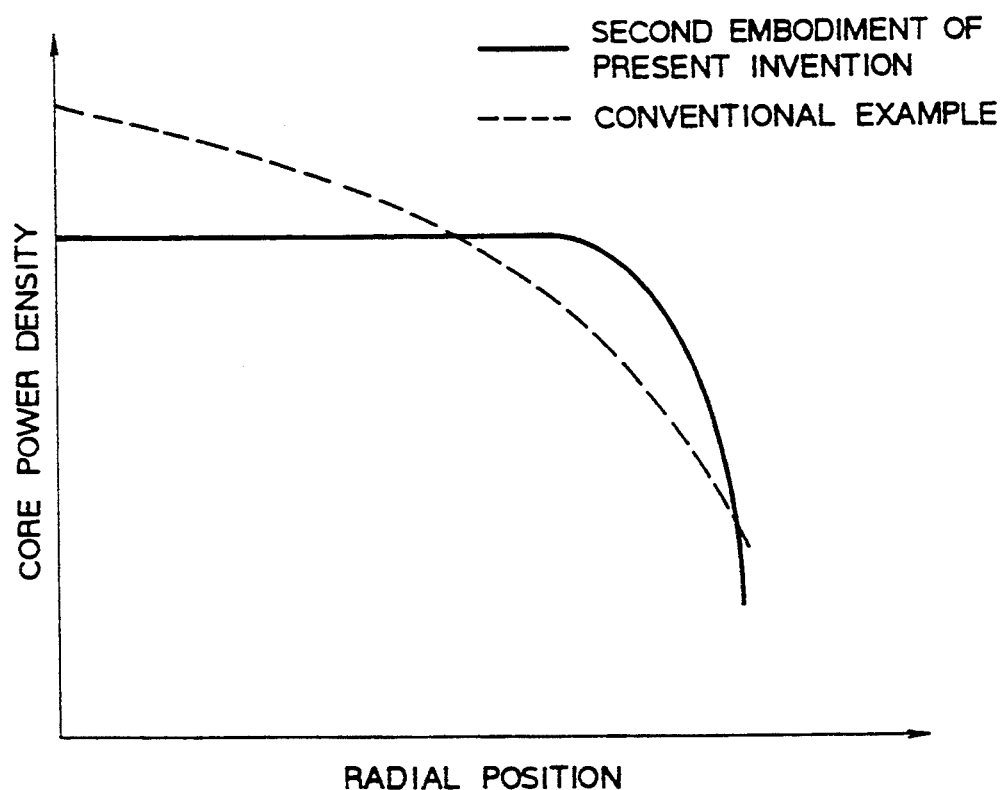
FIG. 17 is a graph showing a radial distribution of a power density in the second embodiment as compared with a prior art.
Figure 18:
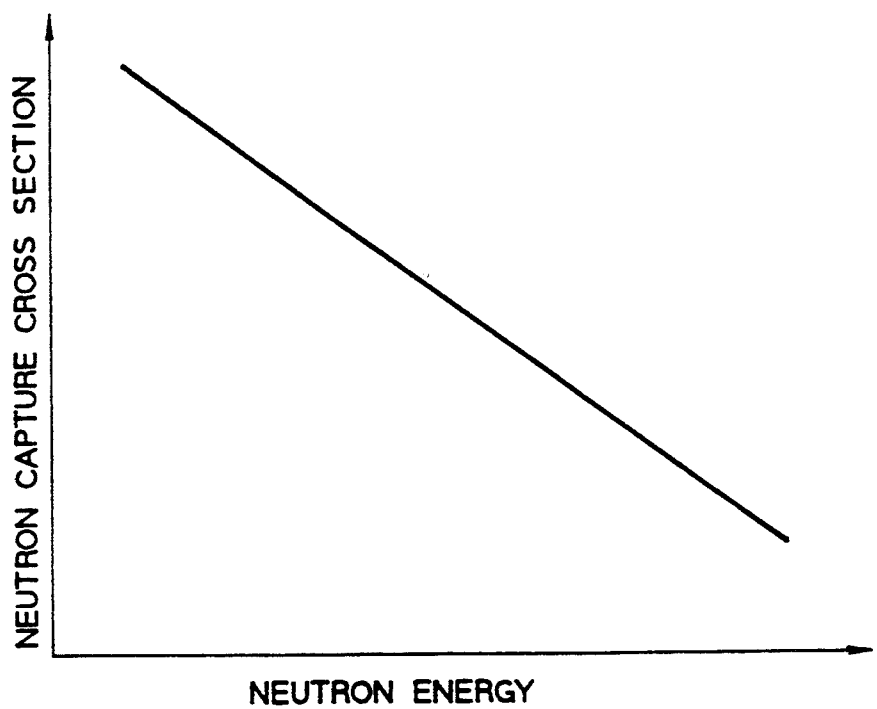
FIG. 18 is a graph showing a relation between a neutron energy and a neutron capture cross section.
Figure 19:
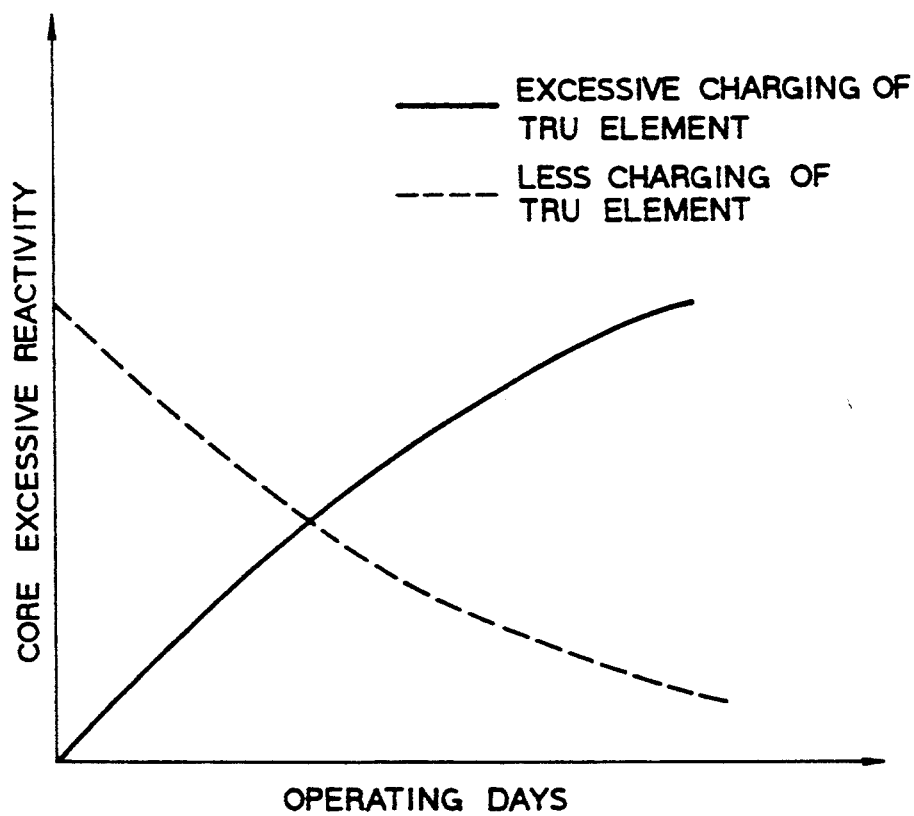
FIG. 19 is a graph showing a relation between an excess reactivity of a reactor and the number of days having passed for the reactor operation in a prior art.
Figure 20:
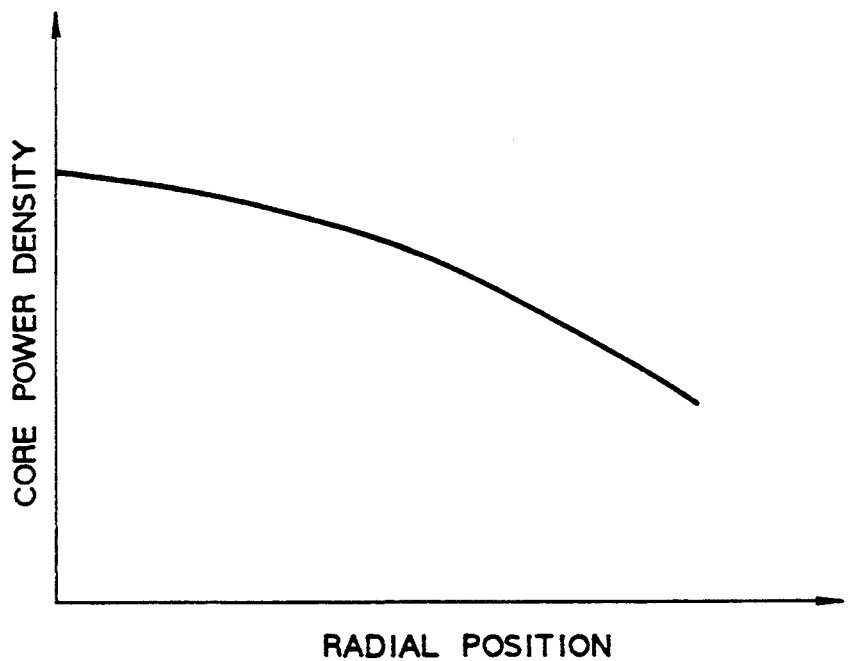
FIG. 20 is a view showing a radial distribution of a power density when a Pu enrichment is one kind in a prior art.

Even in the case of a reactor core where the Pu enrichment is one kind, the fast reactor core represented in this embodiment has a radial distribution of the MA element charging density flattened preferably as compared with the prior art as shown in FIG. 6 and also has a radial power distribution of the core flattened as shown in FIG. 17. Accordingly, from employing the present invention, the reactor power distribution is flattened despite Pu enrichment being one kind and therefore, the plant efficiency will be enhanced, and the economical efficiency such as decrease in fuel fabrication cost or the like may also be enhanced. Needless to say, a similar characteristic to the first embodiment applies to those other than the reactor power distribution.

Further, as another embodiment, the axial distribution is applied to the MA elements charging density as in the case where a radial reactor power distribution is flattened according to the present invention as described above, thereby flattening the axial reactor power distribution.

If the power distribution need not be flattened, an MA content of the whole core will be set according to the present invention even in case a distribution is not applied particularly to the MA elements charging density, thereby realizing effects such as decrease in excess reactivity of the reactor through the operation, prevention of overheating and failure of the fresh fuel assembly outside the reactor and the like.

As described above, in the transuranium element transmuting reactor core relating to the present invention, since an amount of transuranic elements added to the fuel element of fuel assemblies is controlled so as to keep an excess reactivity of the reactor substantially zero through the operation of the reactor, the decrease of the effective multiplication factor according to the lapse of time for the operation is prevented, the excessive deterioration and turbulence of the reactor power distribution can be prevented, the reliability of the power plant is thus enhanced, and as seeking an improvement of the plant operating efficiency, transuranium elements (TRU elements) can be transmuted efficiently.

Then, from setting charging amounts of $^{242}$Cm, $^{244}$Cm and $^{241}$Am into the fuel assembly so as to realize:

$$1.2\times10^2\times M_{242}+2.8\times M_{244}+1.1\times10^{-1}\times M_{241}<Q_1$$

where an upper bound of heating rates of the single fuel assembly outside the reactor is $Q_1$, charging amounts of $^{242}$Cm, $^{244}$Cm and $^{241}$Am which can be charged into the single fuel assembly are $M_{242}$, $M_{244}$ and $M_{241}$, and also to realize:

$$1.2\times10^2\times M_{242}{}^L+2.8\times M_{244}{}^L+1.1\times10^{-1}\times M_{241}{}^L<Q_2$$

where an upper bound of heating rates of per unit length of the fuel pellet contained in the fuel pins is $Q_2$, charging amounts of $^{242}$Cm, $^{244}$Cm and $^{241}$Am per the unit length are $M_{242}{}^L$, $M_{244}{}^L$ and $M_{241}{}^L$, a melting of the fuel pellet during the reactor operation of the reactor and an overheating or failure of the fuel assemblies outside the reactor can be prevented and a neutron absorption effect of $^{242}$Cm, $^{244}$Cm and $^{241}$Am is available for eliminating accidents of a control rod and a neutron absorbing material of the control rod and also for realizing the improvement of the heat removing efficiency of the core, the economical efficiency will be enhanced, the safety and the reliability of the core and the fuel assemblies will be enhanced as well, and the TRU elements can be transmuted efficiently.

Further, by setting a charging density of minor actinides to lessen outwards of a core center in a core area where a plutonium content is even and also by setting a charging density of minor actinides high accordingly in an area where Pu is enriched high at the core of a Pu-enriched area, the radial distribution of the reactor power can be flattened, the excessive deterioration or turbulence of the reactor power distribution will never result, the enhancement of safety and reliability of the core and the fuel assemblies may be realized, and thus the TRU elements can be quenched efficiently.

Further embodiments of the present invention will be described hereunder in conjunction with FIGS. 22 to 30, with reference to transuranium elements transmuting fuel pins and fuel assemblies.

Figure 22:
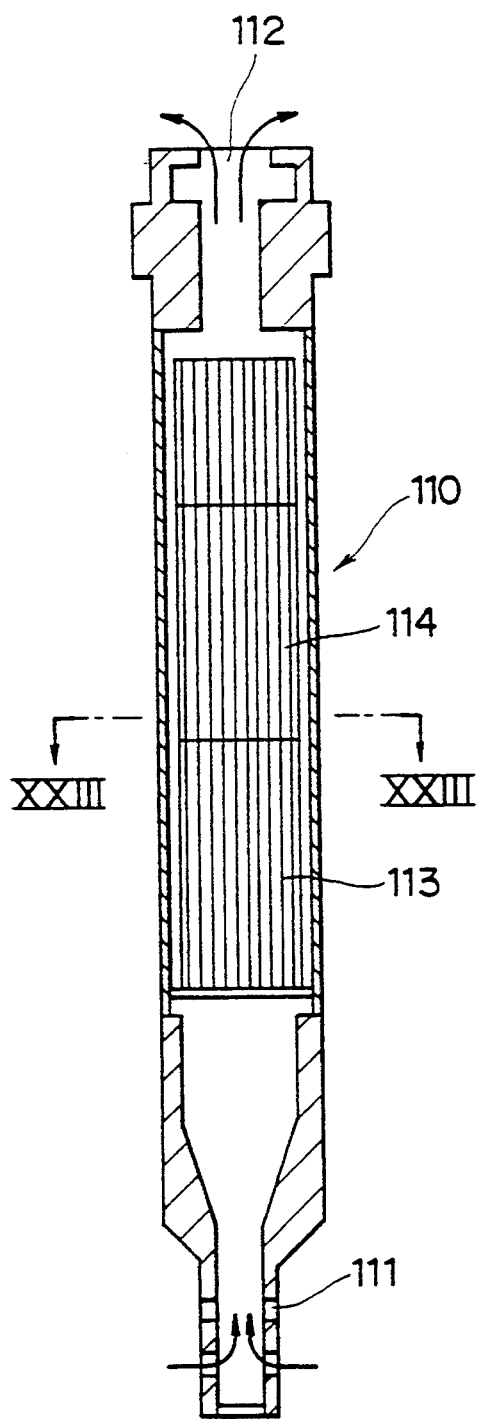
FIG. 22 is an elevational section representing schematically one embodiment of a transuranium elements transmuting fuel assembly relating to the present invention.

FIG. 22 exemplifies a transuranium elements transmuting fuel assembly according to another embodiment of the present invention which is charged into the fast reactor core. The fuel assembly 110 has a coolant inlet 111 at the lower portion thereof for letting in the coolant such as liquid sodium (Na), liquid NaK, helium (He) gas or the like and a coolant outlet 112 at the upper portion thereof, and a plurality of fuel pins 114 are enclosed in a bundle within a wrapper tube 113 square tubular or, for example, hexagonal in section which works as a fuel channel. The fuel pin 114 enclosed within the wrapper tube 113 may be constructed only of a TRU (transuranium elements) fuel pin 115, or of the TRU fuel pin 115 and an ordinary fuel material pin 116 otherwise as shown in FIG. 23.

In the case of TRU fuel assembly having constructed the fuel assembly 110 only of the TRU fuel pins 115, nothing will be taken into consideration for arrangement of the TRU fuel pins 115, an administration on manufacture and assembling of the TRU fuel pins 115 is facilitated, the number of fuel assemblies for which a special measure such as heat removing, shielding or the like is required may be minimized, thus enhancing an economical efficiency on a core administration and a fuel handling.

Then, in case the TRU fuel assembly 110 is constructed of the TRU fuel pin 115 and the ordinary fuel material pin 116, the change in reactor power according to the reactor operation is minimized for presence of the TRU elements, and the TRU elements can be transmuted efficiently without lowering a cooling efficiency of the core as, in addition, keeping the integrity of the reactor internal structure.

Figure 23:
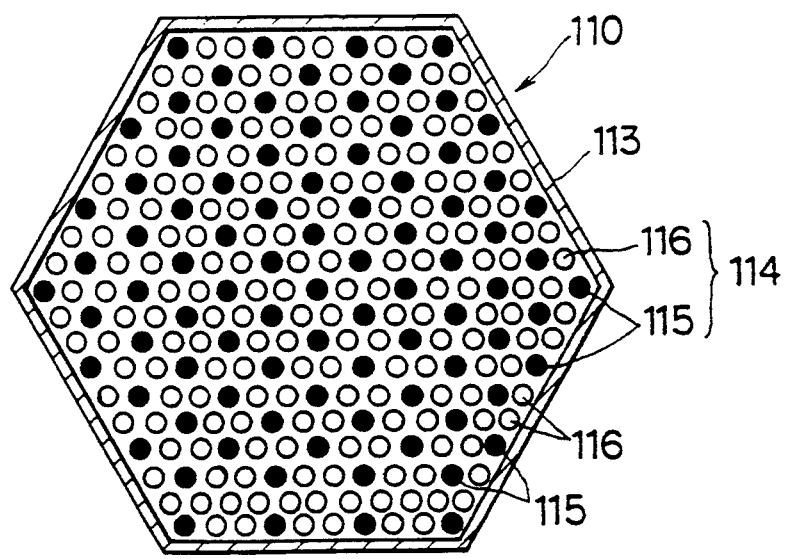
FIG. 23 is a sectional plan view taken along the line XXIII—XXIII of FIG. 22.

FIG. 23 exemplifies the case where the TRU fuel pins 115 are dispersed and disposed almost uniformly within the wrapper tube 113 of the TRU fuel assembly 110. By dispersing and disposing the TRU fuel pins 115 uniformly, a relatively low-temperature coolant around the TRU fuel pins 115 and a relatively high-temperature coolant around the usual fuel material pins 116 are mixed acceleratedly in the presence of the TRU element, a fuel clad temperature of the ordinary fuel material pin 116 is decreased, the cooling efficiency of the core can be enhanced, the ordinary fuel material pin 116 can be made to last so long, and the economical efficiency and safety of the fast reactor can thus be enhanced.

Figure 24:
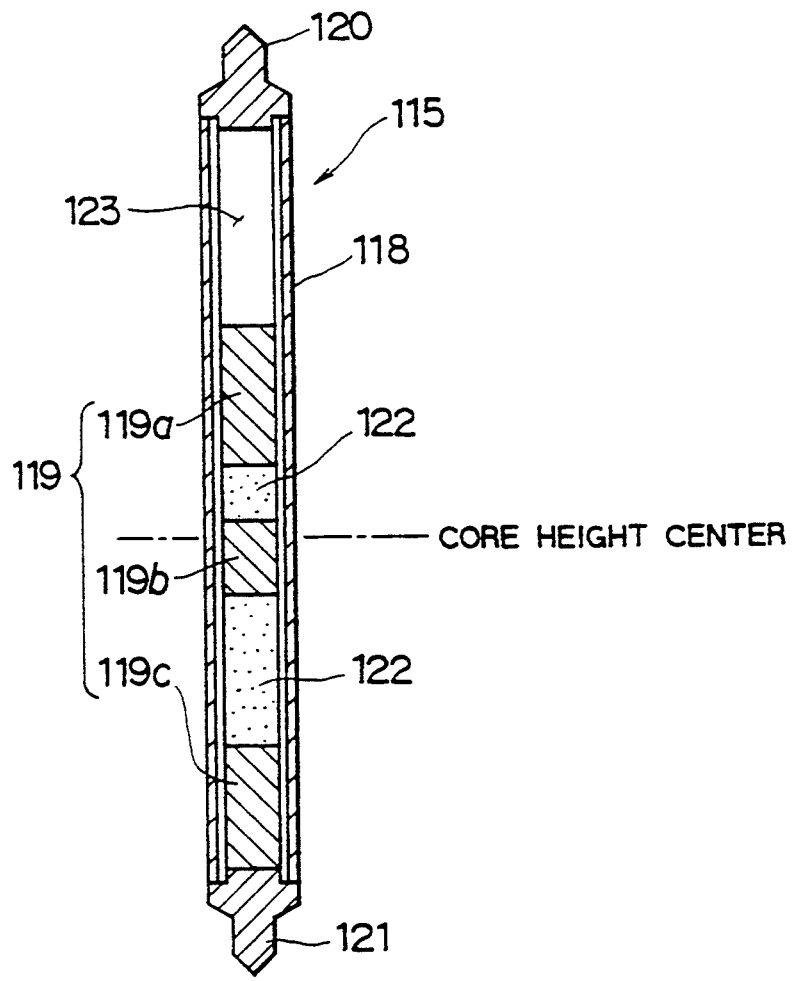
FIG. 24 is an elevational section view showing a TRU fuel pin which is a transuranium element transmuting fuel with which the fuel assembly is charged.

Meanwhile, as shown in FIG. 24, the TRU fuel pin 115 has a fuel clad 118 charged with a TRU fuel material 119, and its upper and lower portions closed by an upper end plug 120 and a lower end plug 121. The TRU fuel material 119 has at least one of an ordinary fuel material and a fertile material consisting of degraded uranium, natural uranium and depleted uranium contain TRU elements (trans- uranium elements) of minor actinides elements such as Np (neptinium), Am (americium), Cm (curium) and the like. Here, the ordinary fuel material refers to a fuel material consisting of an enriched uranium and an uranium-plutonium mixed fuel (uranium fuel having enriched plutonium). An oxide fuel such as uranium oxide or the like is used for the fuel material, however, a metallic fuel may be employed instead of the oxide fuel.

Further, the ordinary fuel material pin 116 has the fuel clad charged with a plurality of so-called fuel pellets (or metallic fuel otherwise) having sintered the ordinary oxide fuel material, and the upper and lower ends closed by the upper end plug and the lower end plug, a gas plenum part being formed on at least one portion, or upper and lower portions, for example, in the fuel clad.

Then, the TRU fuel pin 115 and the ordinary fuel material pin 116 have been described with reference particularly to a closed type one closed by the upper and lower end plugs, however, this need not always be a full-closed type, and hence a so-called vented type fuel pin which is capable of discharging fission products gas (hereinafter called FP gas) generated by the fission outside the fuel pins 115 and 116 may be employed.

FIG. 24 exemplifies the TRU fuel pin 115 working as a transuranic elements transmuting fuel. The fuel pin 115 is that of having a multiplicity of TRU fuel areas provided axially, a TRU fuel 119a high in content of Np of the minor actinides elements is disposed in a core upper portion area of the fuel clad 18, a TRU fuel 119c high in content of Am and Cm is disposed in a core lower portion area, and a TRU fuel 119b is also disposed in a core height center area high in a neutron flux level, and an ordinary fuel 122 is disposed among the TRU fuels 119a, 119b, 119c to constitute the TRU fuel material 119. A gas plenum part 123 is formed on an upper portion of the fuel clad 118, the upper and lower ends being closed by the upper end plug 120 and the lower end plug 121. In the gas plenum part 123, a spring is installed, as occasion demands, so as to stably hold the TRU fuel material 119.

Figure 25A:
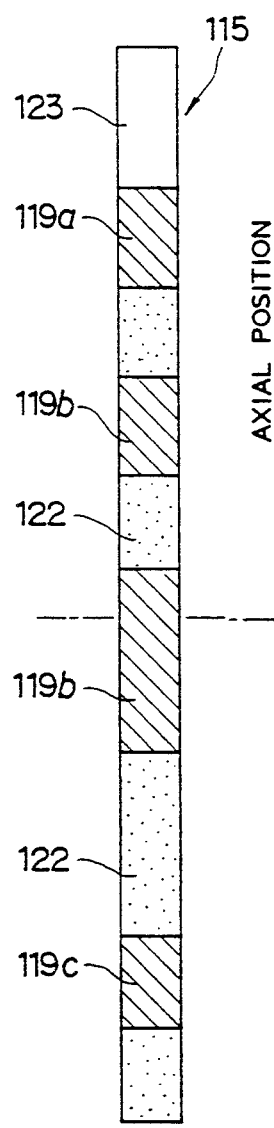
FIG. 25A and 25B are comparative figures showing a TRU fuel disposition characteristic and an axial power distribution of the TRU fuel pin correspondingly with each others.
Figure 25B:
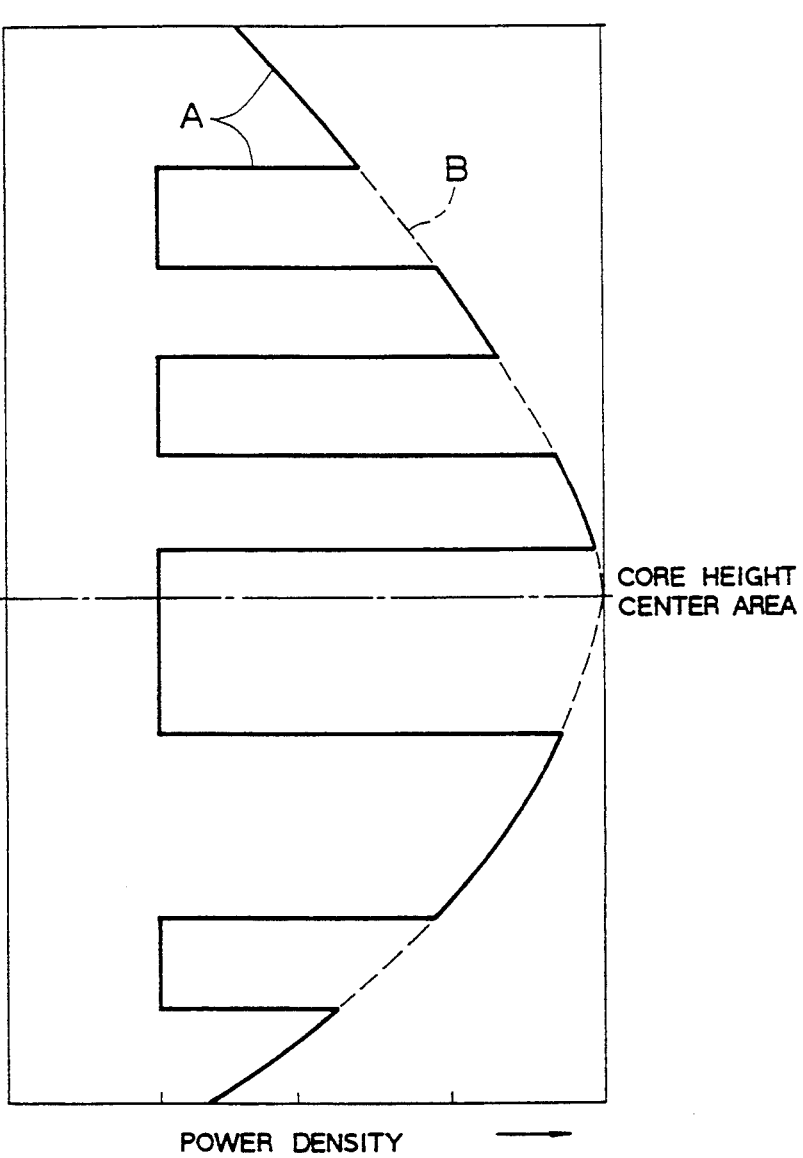

By disposing the TRU fuels 119a, 119b, 119c with which the fuel clad 118 of the TRU fuel pin 115 is charged inside as indicated in FIG. 25A, a core axial power distribution curve A of the fast reactor is as indicated by a full line and a peak power is decreased more than a core axial output distribution curve B indicated by a broken line in the case of the ordinary fuel material pin 116, thus the reactor characteristic and the transmuting efficiency of the TRU elements being improved. Typical minor actinides elements $^{237}$Np, $^{241}$Am, $^{243}$Am, $^{242}$Cm, $^{244}$Cm of the TRU fuels 119a to 119c with which the TRU fuel pin 115 is charged inside the capture neutrons to fissionable elements as shown in FIGS. 9A to 9D when charged into the fast reactor core to the reactor operation, thus transmuting the TRU elements.

Further, due to the TRU fuel pin 116 having the fuel clad 118 charged with the TRU fuel pellets 119 inside, there arises a problem that the melting of the fuel drops due to the presence of the minor actinides elements.

The fuel melting will not result even at the transient conditions of the fast reactor according to a normal core design, and in the TRU fuel pin 115 shown in FIG. 24, the TRU fuel 119a high in content of low melting point MA elements is disposed in the core area with high fuel temperature, namely the core upper portion area in the case of the metallic fuel, and the core height center area in the case of the oxide fuel, and the TRU fuel 19c high in content of high melting point MA elements is disposed in the core lower portion area where the fuel temperature is low. By disposing the TRU fuel 119c containing Am and Cm with the melting point dropping comparatively large for the oxide fuel in the area where the fuel temperature is low, the drop of the fuel melting point due to the content of the TRU element such as Am and Cm or the like does not exert an influence directly on determination of the core power density, and the TRU elements can be transmuted efficiently without lowering the core power density.

On the contrary, the melting point of Np is lower than that of Am and Cm for the metallic fuel.

Figure 27:
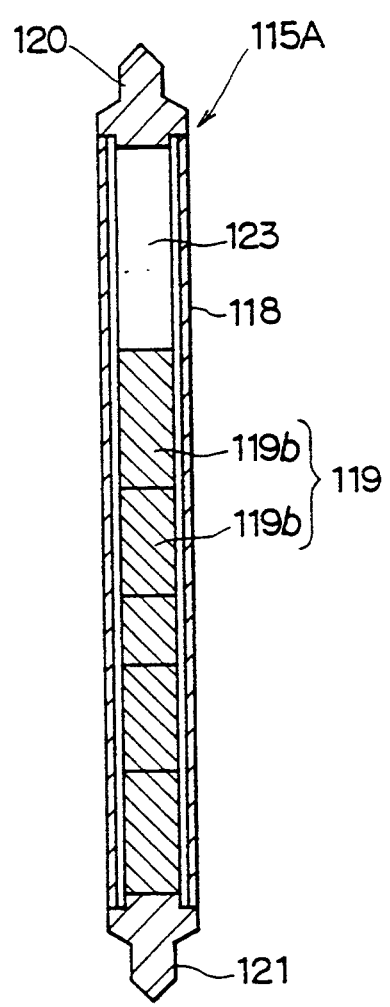
FIG. 27 is an elevational section exemplifying a first alternative of the TRU fuel pin.

Meanwhile, typical minor actinides elements $^{237}$Np, $^{241}$Am, $^{243}$Am, $^{242}$Cm, $^{241}$Cm of the TRU fuel pellets 119 with which the fuel clad 18 of the TRU fuel pin 115 are charged inside are transformed into fissionable elements, as shown in FIGS. 9A to 9D, by a neutron absorption, and therefore, a power of the TRU fuel assembly constructed only of the TRU fuel pin 115 sharply increases as indicated by a symbol I in FIG. 27 according to the number of days for operation. Accordingly, the power of the TRU fuel assembly constructed only of the TRU fuel pin 115 is low at the point in time of start for operation but increases largely according to the operation.

Figure 26:
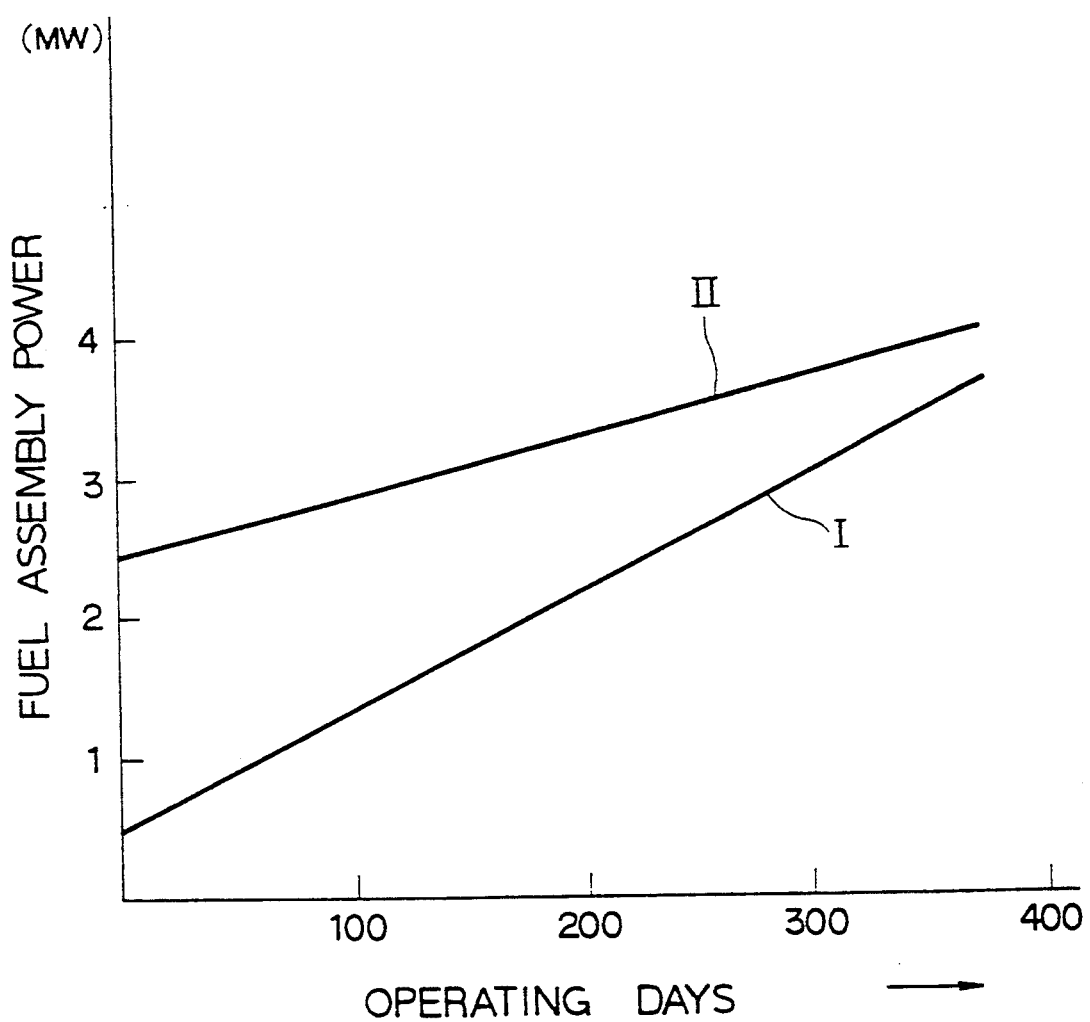
FIG. 26 is a graph showing a power change according to the number of days for operation of the TRU fuel assembly consisting only of the TRU fuel pins.

Then, as shown in FIG. 24, in the TRU fuel assembly 110 for which the TRU fuel pin 115 and the ordinary fuel material pin 116 are disposed mixedly, since the ordinary fuel material pin 116 generates power, the power of the TRU fuel assembly 110 is also high relatively at the point in time of start for the reactor operation as indicated by a symbol II in FIG. 26, and since the decrease in the fissionable material of the ordinary fuel material pin 116 and the transformation of the TRU fuel element 119 into a fissionable material are offset, the degree of power flunctuation of the TRU fuel assembly 110 due to the operation is smaller and smoother than the fuel assembly constructed only of the TRU fuel pin 115.

In a core design, a coolant flow rate of the fuel assembly charged into the core is specified so as to remove heat at the time of maximum power of the fuel assembly. The TRU fuel assembly constructed only of the TRU fuel pin 115 does not generate a power corresponding to the coolant flow rate at the time of start for the operation or for a several time after the start, an outlet temperature is low consequently, and therefore, the coolant outlet temperature does not rise, thus leaving a problem on the cooling efficiency of the core and the integrity of the reactor internal structure.

However, in the case of the TRU fuel assembly for which the TRU fuel pin 115 and the ordinary fuel material pin 116 are disposed mixedly as shown in FIG. 23, the power coming up substantially to the maximum power is generated at the time of the start for the operation or for a several time after the start, and therefore, an outlet temperature of the TRU fuel assembly 110 will not drop extremely, and thus the problem on the cooling efficiency of the core and the integrity of the reactor internal structure can be avoided.

Then, as shown in FIG. 24, by mixing a radioactive fission product (F. P) such as strontium (Sr), alkaline metals (Cs or the like), technetium (Tc) or the like into the TRU fuel pellets 119 with which the fuel clad 118 of the TRU fuel pin 115 is charged inside, the transmuting of the TRU elements and also the transmuting of a long-lived radioactive fission products in the reactor and the internal administration of the reactor are realizable. The disposal and administration of the radioactive waste products will be facilitated as compared with the case where these are carried out outside the reactor.

For example $^{99}$Tc is transformed into a stable elements which is not radioactive in the fast reactor by neutron capture (neutron absorption) and others, and $^{90}$Sr and $^{137}$Cs become:

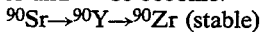
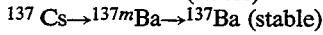

$^{90}$Sr→$^{90}$Y→$^{90}$Zr (stable)

$^{137}$Cs→$^{137m}$Ba→$^{137}$Ba (stable)

by natural decay while residing in the reactor, and $^{90}$Zr and $^{137}$Ba are stable materials, which are removed from a fuel through the spent fuel reprocessing.

In the TRU fuel pin 115 shown in FIG. 24, the case where TRU fuels 119a, 119b, 119c are dispersed and arranged axially is exemplified, however, a TRU fuel pin 115A may be constructed as shown in FIG. 27 so as to minimize the influence to be exerted on the reactor power distribution by the TRU elements. Like reference characters are applied to the like portions in FIG. 24, and a further description will be omitted here.

The TRU fuel pin 115A exemplifies the case where the TRU fuels 119b containing the TRU element which constitute the TRU fuel pellets 119 are disposed even axially at a relatively low content (several percent by weight or below). The TRU fuel pin 115 for which the TRU fuels are disposed uniformly has an advantage that an administration on fabrication and transportation is facilitated, a fabrication cost can be reduced, and an influence to be exerted on an axial power distribution is uniform and minimized. Further, the TRU fuel pin 115A is much in the TRU elements loading amount per pin, and thus is available for enhancing the transmuting efficiency of the TRU elements.

Figure 28:
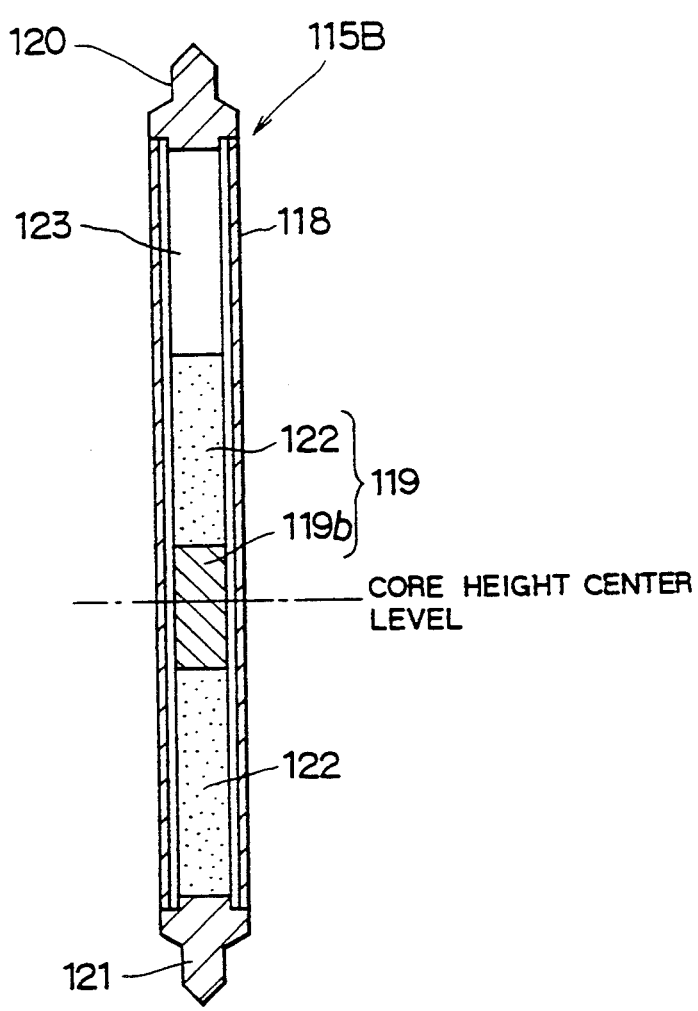
FIG. 28 is an elevational section exemplifying a second alternative of the TRU fuel pin.

A TRU fuel pin 115B shown in FIG. 28 exemplifies the case where the TRU fuel pellets 119 with which the fuel clad 118 is charged inside has the TRU fuel 119b disposed only in the core height center area, and such disposition is effective in decreasing a peak power and flattening the core axial power distribution. By disposing the TRU fuel 119b in the core height center area where a neutron flux density is high, the power peak is reduced preferably by the distortion of the core axial power distribution, the power distribution is flattened, and a reactor characteristic is improved to enhance the transmuting efficiency of the TRU elements.

Then, in this case, the content (percent by weight) of the TRU elements contained in the TRU fuel 119b is relatively high to stand, for example, at 10% or over as in the case of the TRU fuel pin 115 of FIG. 24.

Figure 29:
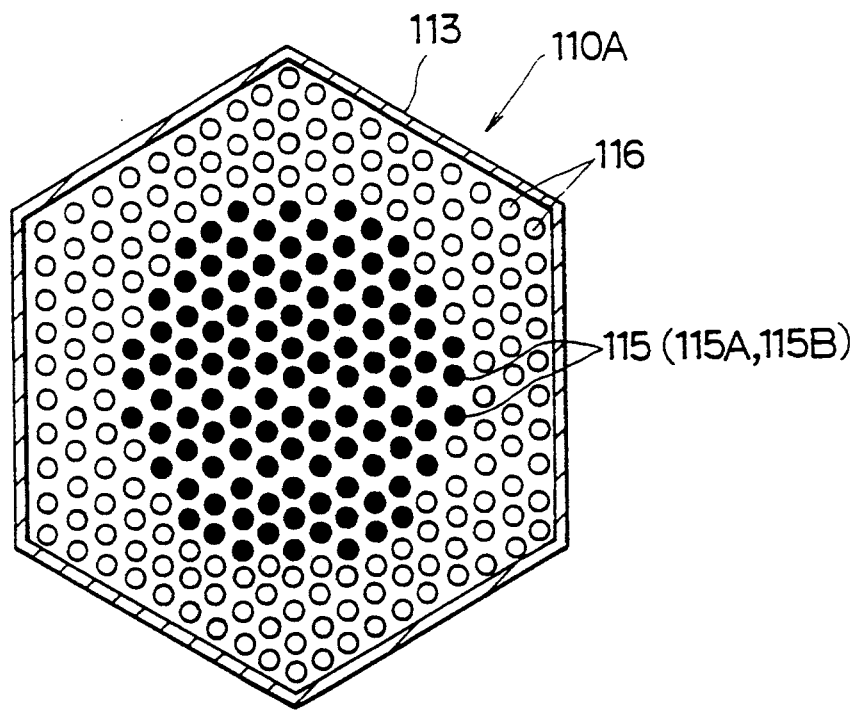
FIG. 29 is a sectional plan view corresponding to FIG. 23 which exemplifies a first alternative of the TRU fuel assembly or a transuranium element transmuting fuel assembly.

Further, in the first embodiment of the transuranic elements transmuting fuel assembly 110, the case where the TRU fuel pins 115 are dispersed and disposed uniformly in the TRU fuel assembly 110 as shown in FIG. 23, however, the fuel pins 115 (115A, 115B) will be disposed intensively in the center area of the TRU fuel assembly 110, as shown in FIG. 29, and the ordinary fuel material pins 116 will be disposed around the TRU fuel pins 115 otherwise.

In case the TRU fuel pins 115 are disposed intensively in the center area, since the TRU fuel assembly 110A has the neutron flux density maximized at the center area, the transmuting efficiency of the TRU elements can be enhanced.

In the TRU fuel assembly 110A, the fuel pins disposed around the TRU fuel pins 15 (15A, 15B) may comprise a fertile material pin consisting of natural uranium and depleted uranium, and by disposing such fertile material pins, alpha rays and neutrons emitted from the TRU fuel pins 115 are shielded, and thus measures on transportation and shielding of the TRU fuel assembly 110A may be relieved.

Figure 30:
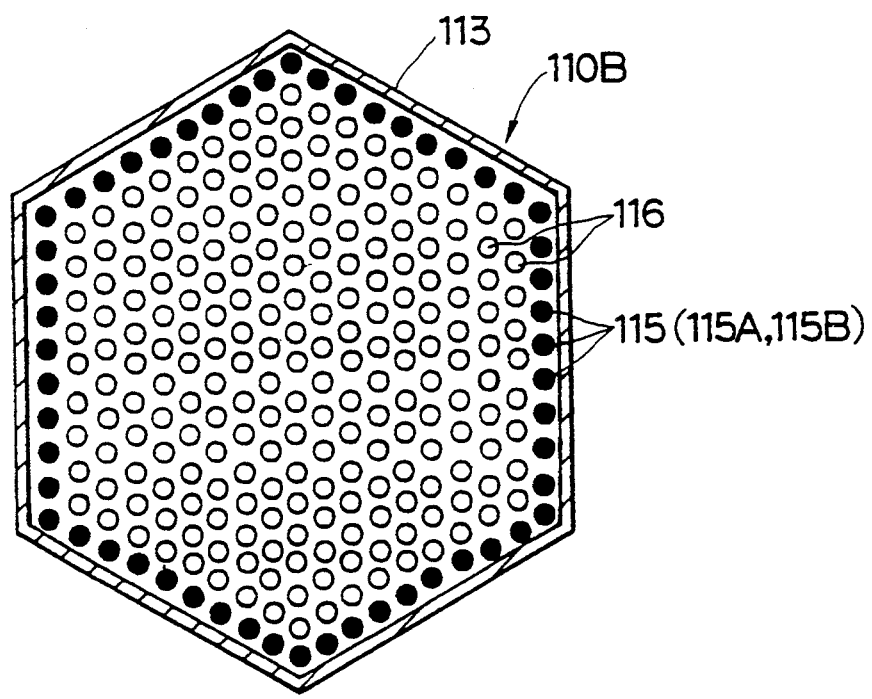
FIG. 30 is a sectional plan view corresponding to FIG. 24 which exemplifies a second alternative of the TRU fuel assembly.

A TRU fuel assembly 110B shown in FIG. 30 exemplifies the case where the TRU fuel pins 115 (115A, 115B) are disposed at an outer peripheral position abutting on a inside wall of the wrapper tube 113. The ordinary fuel material pins 116 are disposed inside of the TRU fuel pins 116 arrayed as above.

Generally, the coolant flow rate per one fuel pin is larger on the wall side of the wrapper tube 113 than in the center area, and temperature of the fuel clad 118 on the wall side becomes lower than the center area.

When the metallic fuel is employed as the fuel of the TRU fuel assembly 110B, it is necessary that the fuel clad temperature be adjusted as low as possible for the prevention of an eutectic reaction of the fuel clad 118, with the metallic fuel slug.

The TRU fuel assembly 10B shown in FIG. 30 is that for which the TRU fuel pins 115 are disposed along the inside wall of the wrapper tube 113 with a coolant flowing much therethrough, the fuel clad temperature is reduced thereby, the economical efficiency of the TRU fuel assembly 110B is thus secured to prolong the lifetime.

Then, the TRU fuel pins 115 (115A, 115B) have typical minor actinides elements easy to cause alpha-decay contained much in the TRU fuel material 119, and thus a relatively high alpha ray energy is emitted at the time of alpha-decay, and therefore, special measures on fabrication, heat removing and shielding which are different from the ordinary fuel will be necessary for the TRU fuel pins 115 (115A, 115B) and the TRU fuel assemblies 110 (110A, 110B). Thus, for the TRU fuel pin 115, the TRU fuel pellets 119 is constructed by containing the TRU elements or specific minor actinides elements at a predetermined content.

For fuel temperature and others to keep in order, it is preferable that the TRU fuel pin 115 be provided with a TRU fuel material area in the area lower than the core height center more than the area upper than the core height center. Further, from inserting a control rod into the core, the transmuting efficiency of the TRU elements may be enhanced by providing the TRU fuel area in the core height center area where a neutron flux level gets high, thereby flattening the core axial power distribution. Further, by disposing the TRU fuel in the area lower than a core height center level whereat the neutron flux level becomes high, the melting of the TRU fuel can be avoided effectively and securely.

As a described above, in the transuranium element transmuting fuel pin and fuel assembly relating to the present invention, an improvement of core characteristics and an enhancement of the core cooling efficiency may be achieved without causing deterioration of the core characteristics according to various restrictions such as fuel melting during the operation of the reactor, excessive change of the core axial power distribution, distortion of the distribution and the like. Thus the safety and reliability of the fuel assemblies and fuel pins to be charged into the core may thus be achieved and the transmuting efficiency of the TRU elements can be improved and enhanced.

What is claimed is:

1. A transuranium element-transmuting fuel assembly, said fuel assembly comprising a wrapper tube and a plurality of fuel pins enclosed within said wrapper tube, said plurality of fuel pins comprising transuranium fuel pins charged with a transuranium element fuel material and an uranium-plutonium mixed fuel material, and non-transuranium fuel pins charged with at least one member selected from the group consisting of enriched uranium fuel material, uranium-plutonium mixed fuel material and mixtures thereof, the amount of transuranium elements being controlled so as to prevent melting of said fuel assembly, wherein the amounts of $^{242}$Cm, $^{244}$Cm and $^{241}$Am in said fuel assembly satisfy the equation $$1.2 \times 10^2 \times M_{242} + 2.8 \times M_{244} + 1.1 \times 10^{-1} \times M_{241} < Q_1$$

wherein $M_{242}$, $M_{244}$ and $M_{241}$ are, respectively, the amounts in grams of $^{242}$Cm, $^{244}$Cm and $^{241}$Am in said fuel assembly and $Q_1$ is the maximum amount of heat in watts which must be removed to prevent melting of said fuel assembly, and wherein the amount of transuranium elements in said fuel assembly satisfies the equation $$1.2 \times 10^2 \times M^L_{242} + 2.8 \times M^L_{244} + 1.1 \times 10^{-1} \times M^L_{241} < Q_2$$

wherein $M^L_{242}$, $M^L_{244}$ and $M^L_{241}$ are, respectively, the amounts in grams of $^{242}$Cm, $^{244}$Cm and $^{241}$Am per unit length of said fuel assembly and $Q_2$ is the amount of heat in watts per unit length of said fuel assembly which must be removed to prevent melting of said fuel assembly.

2. The fuel assembly of claim 1, wherein said transuranium fuel material comprises Sr or alkaline metal radioactive fission products.

* * * * *